United States Patent
Oshinome et al.

(10) Patent No.: US 9,159,293 B2
(45) Date of Patent: Oct. 13, 2015

(54) ELECTRONIC DEVICE, CONTROL METHOD, AND STORAGE MEDIUM STORING CONTROL PROGRAM

(75) Inventors: Haruyoshi Oshinome, Yokohama (JP); Sanae Nishio, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 490 days.

(21) Appl. No.: 13/422,067

(22) Filed: Mar. 16, 2012

(65) Prior Publication Data

US 2012/0235963 A1  Sep. 20, 2012

(30) Foreign Application Priority Data

Mar. 16, 2011  (JP) ................................. 2011-058555
Mar. 25, 2011  (JP) ................................. 2011-067928

(51) Int. Cl.
*G09G 5/00* (2006.01)

(52) U.S. Cl.
CPC .......... *G09G 5/00* (2013.01); *G09G 2320/0271* (2013.01); *G09G 2354/00* (2013.01)

(58) Field of Classification Search
CPC ............ G09G 5/00; G09G 2320/0271; G09G 2354/00; H04N 5/228
USPC ................................................. 345/156–176
See application file for complete search history.

(56) References Cited

U.S. PATENT DOCUMENTS

| | | | |
|---|---|---|---|
| 8,483,780 B2 | 7/2013 | Goris et al. | |
| 2007/0188450 A1* | 8/2007 | Hernandez et al. | 345/158 |
| 2009/0051648 A1* | 2/2009 | Shamaie et al. | 345/156 |
| 2010/0088532 A1 | 4/2010 | Pollock et al. | |
| 2010/0164836 A1 | 7/2010 | Liberatore | |
| 2010/0211915 A1 | 8/2010 | Sawai | |
| 2010/0222046 A1* | 9/2010 | Cumming | 455/418 |
| 2010/0283860 A1* | 11/2010 | Nader | 348/222.1 |
| 2011/0006971 A1 | 1/2011 | Ebey et al. | |

FOREIGN PATENT DOCUMENTS

| | | |
|---|---|---|
| JP | 2002374349 A | 12/2002 |
| JP | 200512805 A | 1/2005 |
| JP | 2006-163294 A | 6/2006 |
| JP | 200835429 A | 2/2008 |
| JP | 2010039772 A | 2/2010 |
| JP | 2010200036 A | 9/2010 |

OTHER PUBLICATIONS

Office Action mailed Aug. 26, 2014, corresponding to Japanese patent application No. 2011-067928.
Office Action issued Jan. 8, 2015, corresponding to U.S. Appl. No. 14/300,939.
Office Action mailed Sep. 30, 2014, corresponding to Japanese patent application No. 2011-058555.

* cited by examiner

*Primary Examiner* — Andrew Sasinowksi
(74) *Attorney, Agent, or Firm* — Hauptman Ham, LLP

(57) ABSTRACT

According to an aspect, an electronic device includes a first face, a second face, a display unit arranged on the first surface, a notification unit arranged on the second surface, an attitude detecting unit, and a control unit. The attitude detecting unit detects whether attitude of the electronic device is a first attitude, in which the first surface faces upward in the vertical direction, or a second attitude, in which the first surface faces downward in the vertical direction. When the attitude detecting unit detects the second attitude, the control unit prevents displaying on the display unit and enables the notification unit to give a notification.

9 Claims, 16 Drawing Sheets

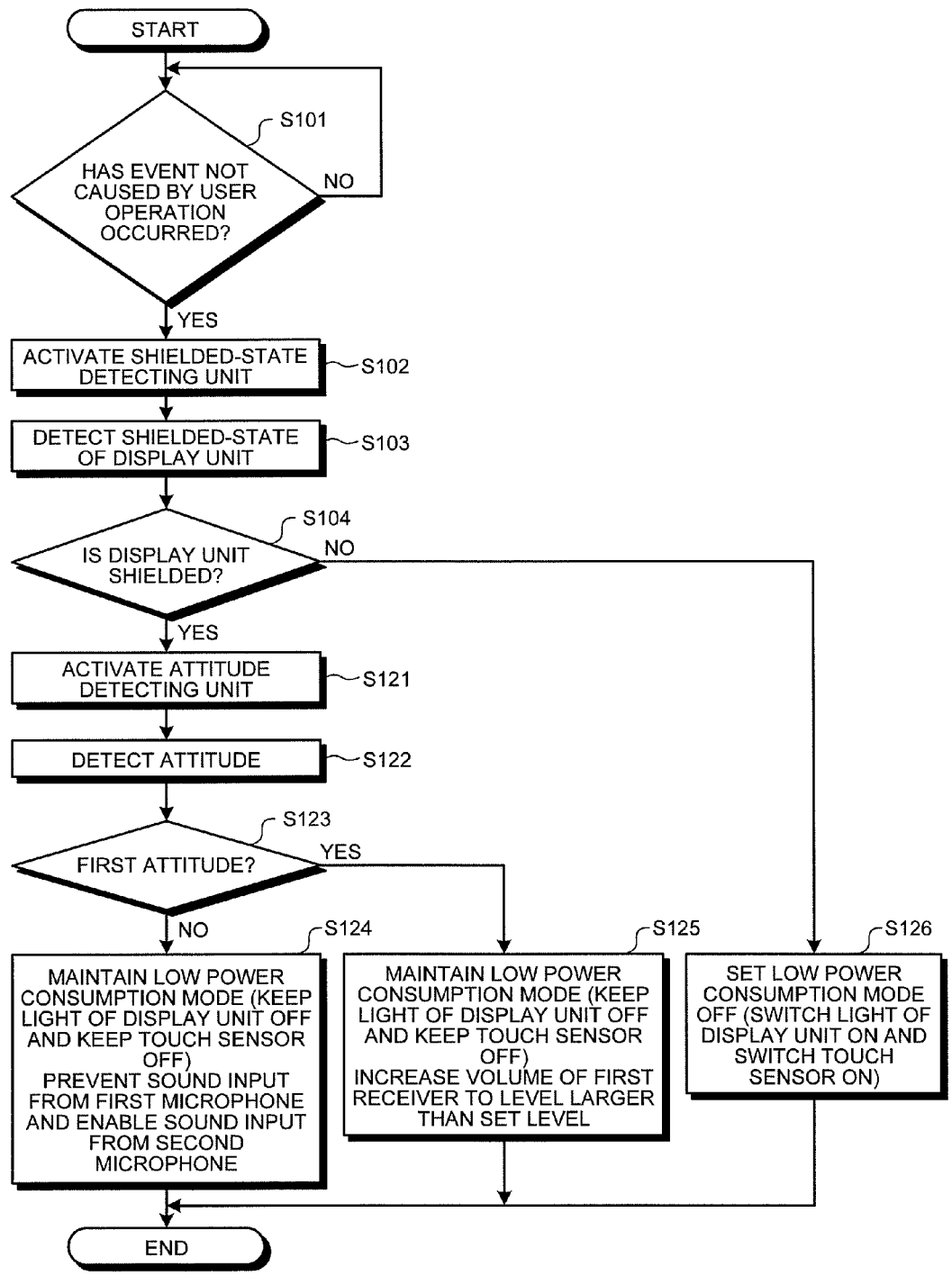

ELECTRONIC DEVICE, CONTROL METHOD, AND STORAGE MEDIUM STORING CONTROL PROGRAM

CROSS-REFERENCE TO RELATED APPLICATIONS

This application claims priority from Japanese Application No. 2011-058555, filed on Mar. 16, 2011, and Japanese Application No. 2011-067928, filed on Mar. 25, 2011, the contents of which are incorporated by reference herein in their entirety.

BACKGROUND

1. Technical Field

The present disclosure relates to an electronic device, a control method, and a storage medium storing therein a control program.

2. Description of the Related Art

Recently, in the field of electronic devices, such as mobile phones, personal digital assistants (PDA), and digital cameras, in order to make small mobile electronic devices that allow intuitive operations and do not need equipment that physically occupies a large area, such as a keyboard, touch panels that function as both display units and operating units have become widely used (see Japanese Patent Application Laid-open No. 2010-39772).

there is a need for an electronic device, a control method, and a control program capable of giving information to the user.

SUMMARY

According to an aspect, an electronic device includes a first face, a second face, a display unit arranged on the first surface, a notification unit arranged on the second surface, an attitude detecting unit, and a control unit. The attitude detecting unit detects whether attitude of the electronic device is a first attitude, in which the first surface faces upward in the vertical direction, or a second attitude, in which the first surface faces downward in the vertical direction. When the attitude detecting unit detects the second attitude, the control unit prevents displaying on the display unit and enables the notification unit to give a notification.

According to another aspect, an electronic device includes a first surface, a display unit arranged on the first surface, a shielded-state detecting unit, and a control unit. The shielded-state detecting unit detects whether the display unit is shielded. When an event occurs during a low power consumption mode, the control unit maintains the low power consumption mode if the shielded-state detecting unit detects that the display unit is shielded, and sets the low power consumption mode off if the shielded-state detecting unit detects that the display unit is not shielded.

According to another aspect, a control method is a method for controlling an electronic device that includes a first surface; a second surface; a display unit arranged on the first surface; a notification unit arranged on the second surface; and an attitude detecting unit. The method includes: detecting, by the attitude detecting unit, whether the attitude is a first attitude, in which the first surface faces upward in the vertical direction, or a second attitude, in which the first surface faces downward in the vertical direction; and preventing displaying on the display unit and enabling the notification unit to give a notification when the second attitude is detected.

According to another aspect, a control method is a method for controlling an electronic device that includes a display unit and a shielded-state detecting. The method includes: setting a low power consumption mode on; raising an event; detecting by the shielded-state detecting unit whether the display unit is shielded; maintaining the low power consumption mode when it is detected, by the detecting after the raising, that the display unit is shielded; and setting the low power consumption mode off when it is detected, by the detecting after the raising, that the display unit is not shielded.

According to another aspect, a non-transitory storage medium stores therein a control program. When executed by an electronic device that includes a first surface; a second surface; a display unit arranged on the first surface; a notification unit arranged on the second surface; and an attitude detecting unit, the control program causes the electronic device to execute: detecting, by the attitude detecting unit, whether the attitude is a first attitude, in which the first surface faces upward in the vertical direction, or a second attitude, in which the first surface faces downward in the vertical direction; and preventing displaying on the display unit and enabling the notification unit to give a notification when the second attitude is detected.

According to another aspect, a non-transitory storage medium stores therein a control program. When executed by an electronic device that includes a display unit and a shielded-state detecting, the control program causes the electronic device to execute: setting a low power consumption mode on; raising an event; detecting by the shielded-state detecting unit whether the display unit is shielded; maintaining the low power consumption mode when it is detected, by the detecting after the raising, that the display unit is shielded; and setting the low power consumption mode off when it is detected, by the detecting after the raising, that the display unit is not shielded.

BRIEF DESCRIPTION OF THE DRAWINGS

FIG. 19 a flowchart illustrating an example of a process performed during a low power consumption mode.

DETAILED DESCRIPTION

Exemplary embodiments of the present invention are described in detail below with reference to the accompanying drawings. It should be noted that the present invention is not limited to the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

Although, in the following explanation, a mobile phone is used as an example of an electronic device, applications of the present invention are not limited to mobile phones. The present invention is applicable for any other electronic devices that a user can change its orientation, including but not limited to personal handyphone systems (PHS), personal digital assistants (PDA), portable navigation units, personal computers (including but not limited to tablet computers, netbooks etc.), media players, portable electronic reading devices, and gaming devices.

First Embodiment

Figure 1:
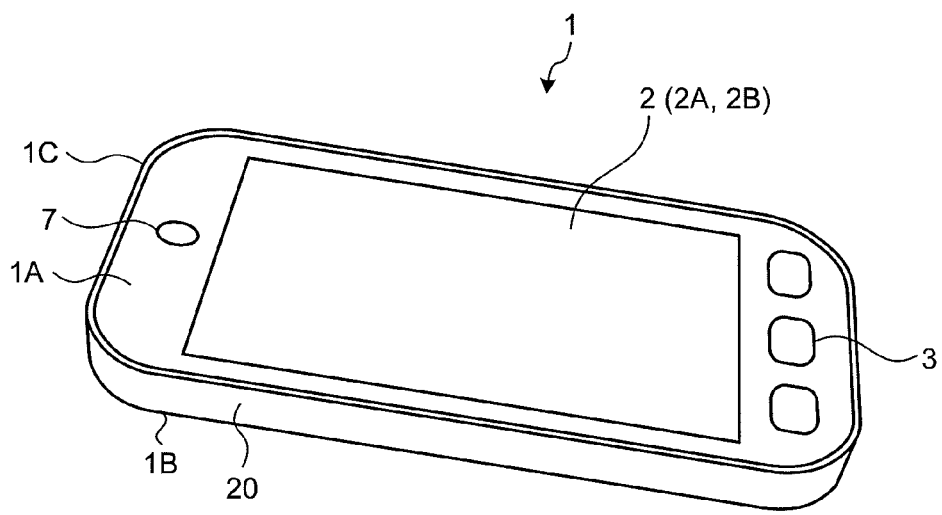
FIG. 1 is a perspective view of a mobile phone according to a first embodiment.
Figure 2:
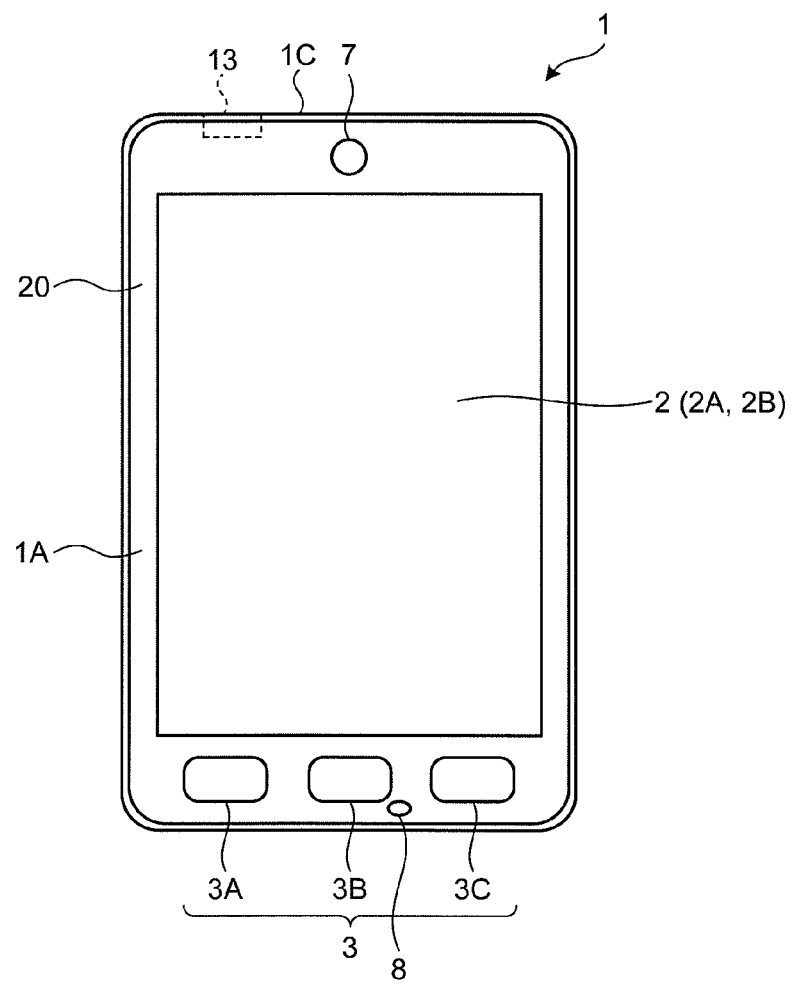
FIG. 2 is a front view of the mobile phone.
Figure 3:
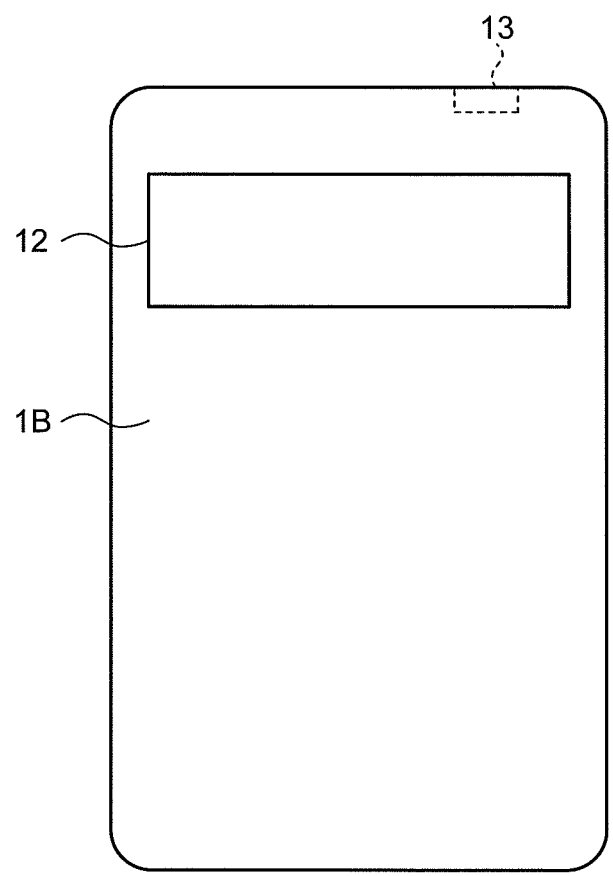
FIG. 3 is a back view of the mobile phone.
Figure 4:
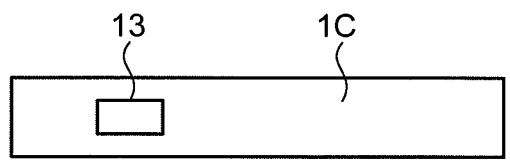
FIG. 4 is a top view of the mobile phone.

Firstly, a mobile phone 1, which is an example of the electronic device according to the first embodiment, will be explained with reference to FIGS. 1, 2, 3, and 4. FIG. 1 is a perspective view of the mobile phone 1. FIG. 2 is a front view of the mobile phone 1. FIG. 3 is a back view of the mobile phone 1. FIG. 4 is a top view of the mobile phone 1. As illustrated in FIGS. 1, 2, 3, and 4, the mobile phone 1 includes a substantially hexahedral housing 20 in which two surfaces thereof are larger than the other surfaces thereof. the mobile phone 1 includes, on the surface of the housing 20, a touch panel 2 that includes a touch sensor 2A and a first display unit 2B (also referred to a "display unit 2B"); an input unit 3; a receiver 7 (also referred to a "first receiver 7"); a microphone 8 (also referred to a "first microphone 8"); a second display unit 12; and a light emitting unit 13.

As illustrated in FIG. 2, the mobile phone 1 has the touch panel 2, the input unit 3, the receiver 7, and the microphone 8 on a front surface 1A (first surface), which is one of the largest surfaces of the housing 20. The touch panel 2 occupies almost the entire area of the front surface 1A. The input unit 3 and the microphone 8 are arranged at one end in the longitudinal direction of the front surface 1A. The receiver 7 is at the other end in the longitudinal direction of the front surface 1A. In other words, the receiver 7 and the microphone 8 are at the different ends in the longitudinal direction, respectively. As illustrated in FIG. 3, the mobile phone 1 has the second display unit 12 on a back surface 1B (second surface) of the housing 20 that is opposite to the front surface 1A. As illustrated in FIG. 4, the mobile phone 1 has the light emitting unit 13 on an upper surface 1C of the housing 20 that is a side surface between the front surface 1A and the back surface 1B and adjacent to the end (short side) of the front surface 1A on which the receiver 7 is arranged. Because the housing 20 is single box shaped, each of the touch panel 2 (the first display unit 2B), the second display unit 12, the light emitting unit 13, etc., is always exposed, i.e., unhidden in the housing 20.

The touch panel 2 is provided on the front surface 1A. The touch panel 2 displays texts, figures, images, etc., thereon and detects various operations made on the touch panel 2 with a finger, a stylus, a pen, etc., (in the description herein below, for the sake of simplicity, it is assumed that the user touches the touch panel 2 and the touch sensor 4 with his/her finger (s)). The touch panel 2 can use any method to detect various operations, such as a pressure sensitive type detection method and a capacitive type detection method. The input unit 3 includes a plurality of buttons, such as buttons 3A, 3B, 3C, etc., that are assigned with predetermined functions.

Figure 5:
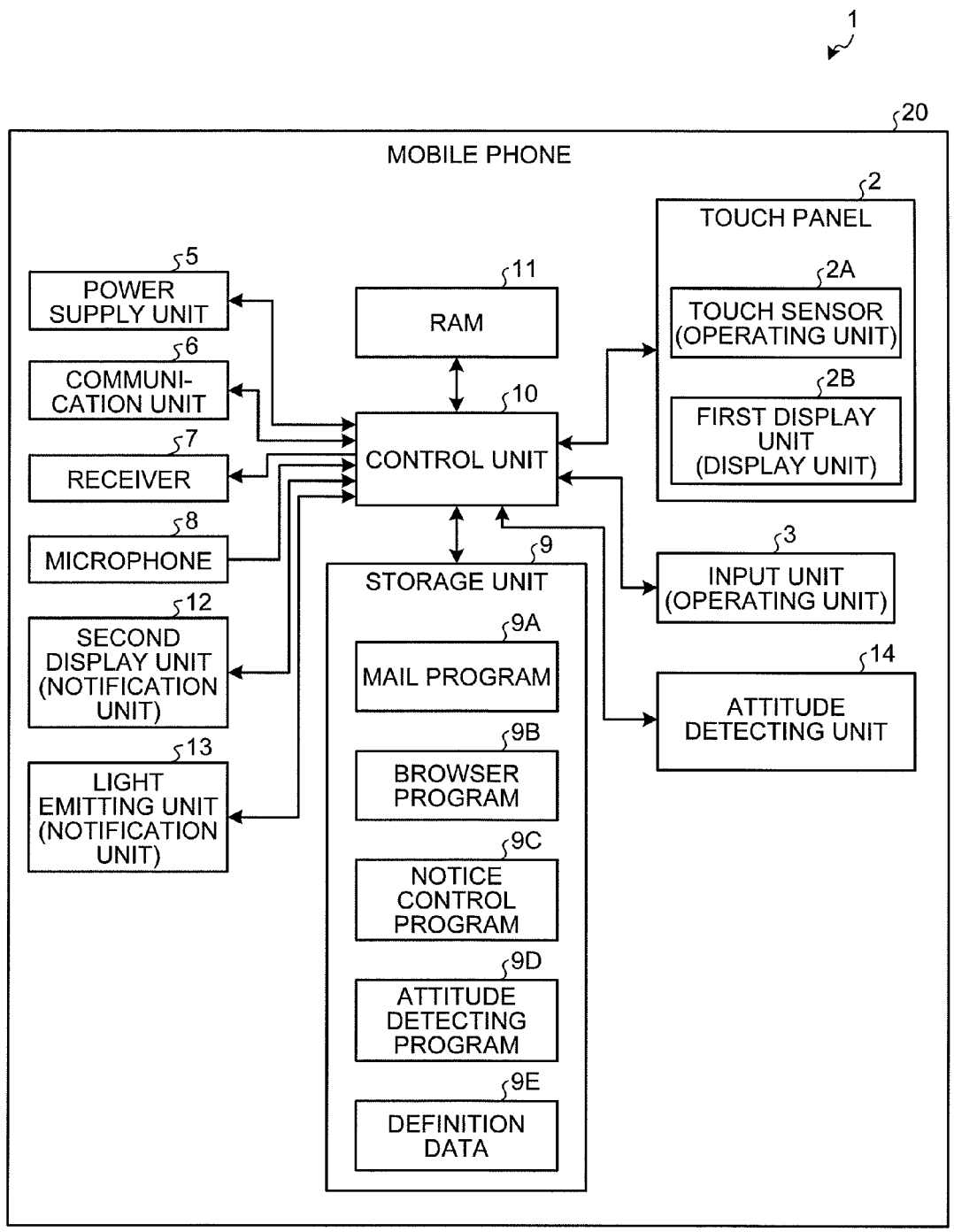
FIG. 5 is a block diagram of the mobile phone.

Then, the functional configuration of the mobile phone 1 will be explained with reference to FIG. 5. FIG. 5 is a block diagram of the mobile phone 1. As illustrated in FIG. 5, the mobile phone 1 includes the touch panel 2, the input unit 3, a power supply unit 5, a communication unit 6, the receiver 7, the microphone 8, a storage unit 9, a control unit 10, a random access memory (RAM) 11, the second display unit 12, the light emitting unit 13, and an attitude detecting unit 14. With the present embodiment, the first display unit 2B functions as a display unit, and at least one of the second display unit 12 and the light emitting unit 13 functions as a notification unit. With the present embodiment, the touch sensor 2A and the input unit 3 function as an operating unit.

The touch panel 2 includes the first display unit 2B and the touch sensor 2A that is imposed on the first display unit 2B. The touch sensor 2A detects an operation made on the touch panel 2 with a finger as well as the position on the touch panel 2 at which the operation is made and sends them to the control unit 10. Operations detected by the touch sensor 2A include tap operations and sweep operations. The first display unit 2B is, for example, a liquid crystal display (LCD), an organic electro-luminescence display (OELD), etc. The first display unit 2B displays texts, figures, etc., thereon.

The input unit 3 receives a user operation via physical buttons, etc., and sends a signal to the control unit 10 in accordance with the received operation. The power supply unit 5 supplies an electric power that is received from a battery or an external power supply to each functional unit of the mobile phone 1 including the control unit 10.

The communication unit 6 establishes a wireless signal path based on a code-division multiple access (CDMA) system, or any other wireless communication protocols, between the mobile phone 1 and a base station via a channel assigned thereto by the base station and makes telephone communications and information communications with the base station. Any other wired or wireless communication or network interfaces, e.g., LAN, Bluetooth, Wi-Fi, NFC (Near Field Communication) may also be included in lieu of or in addition to the communication unit 6. The receiver 7 outputs a sound signal received from the control unit 10 as a sound. The microphone 8 converts a voice of a user, etc., into a sound signal and sends the sound signal to the control unit 10.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.). The storage unit 9 stores therein programs and data that are used when the control unit 10 performs processes. Programs stored in the storage unit 9 include a mail program 9A, a browser program 9B, a notice control program 9C, and an attitude detecting program 9D. Data stored in the storage unit 9 includes definition data 9E. The storage unit 9 also stores therein operating system programs, which realize basic functions of the mobile phone 1, some other programs and data, such as address-book data. The storage unit 9 can be configured to be a combination of a portable storage medium, such as a memory card and an optical disc, and a storage-medium reading device.

The mail program 9A provides a function to realize an e-mail function. The browser program 9B provides a function to realize a WEB browsing function. The notice control program 9C provides a function to realize both a function of giving a notice of an event occurred by a function of any other programs, etc., through screen display or some other means and a function of controlling the display on the first display unit 2B and the second display unit 12. The attitude detecting program 9D provides a function to realize a process of detecting the attitude of the housing 20 by processing a detected result of the attitude detecting unit 14. The definition data 9E stores a definition that relates to a process performed by a function that is realized by processing the notice control program 9C in accordance with the detected result of the attitude of the housing 20 that is detected by a function that is realized by processing the attitude detecting program 9D.

The control unit 10 is, for example, a central processing unit (CPU). The control unit 10 realizes various functions by integrally controlling the operations of the mobile phone 1. More particularly, the control unit 10 executes instructions that are included in program(s) stored in the storage unit 9 by referring to data that is stored in the storage unit 9 and data that is loaded on the RAM 11 as appropriately and then realizes various functions by controlling the display unit 2B, the communication unit 6, etc. Programs executed by the control unit 10 and data referred to can be downloaded from a server via wireless communications by using the communication unit 6.

The control unit 10 realizes the e-mail function by executing, for example, the mail program 9A. Moreover, the control unit 10 realizes, by executing the notice control program 9C, the function of giving a notice of an event occurred by a function of any other program, etc., through screen display or some other means and the function of controlling the display on the first display unit 2B and the second display unit 12. Moreover, the control unit 10 realizes, by executing the attitude detecting program 9D, the function of detecting the attitude of the housing 20 based on a detected result of the attitude detecting unit 14. The control unit 10 can perform several programs in parallel by a multi-task function provided by the operating system program.

The RAM 11 is used as a storage area that temporarily stores therein instructions of programs executed by the control unit 10, data to which the control unit 10 refers, calculation results of the control unit 10, etc.

The second display unit 12 is a display device that is arranged on the back surface 1B to display an image thereon. In other words, the second display unit 12 is arranged on the second surface, which is opposite to the first surface on which the touch panel 2 (the first display unit 2B) is arranged. The second display unit 12 is, for example, a LCD, an OELD, etc. The second display unit 12 displays texts, figures, etc., thereon. The screen display area of the second display unit 12 may be smaller than the screen display area of the first display unit 2B of the touch panel 2. The second display unit 12 can have the touch panel function in the same manner as the first display unit 2B.

The light emitting unit 13 includes a light emitting element that is arranged on the upper surface 10. Light emitting elements, such as a light emitting diode (LED) and an organic light-emitting diode (OLED), can be used. It is possible to switch the light emitting unit 13 to ON and OFF. The light emitting unit 13 emits predetermined light. The light emitting unit 13 is preferably capable of emitting various types of light with different wavelengths or different colors and the color of emitted light is preferably switchable.

The attitude detecting unit 14 is a detector that detects the attitude of the mobile phone 1, more particularly, the attitude (orientation) of the housing 20. Detectors that detect the attitude in various manners can be used as the attitude detecting unit 14, for example, a detector that detects the attitude using an acceleration sensor (more specifically, triaxial acceleration sensor), a detector that detects the attitude using a gyrosensor (more specifically, triaxial gyrosensor), a detector that detects the attitude using a combination of triaxial gyro and a triaxial acceleration sensor. If an acceleration sensor is used as the attitude detecting unit 14; the acceleration sensor is fixed at a predetermined position of the housing 20, the direction in acceleration of gravity, i.e., the vertical direction is calculated from the detected result of the acceleration sensor, and the orientation of the housing 20 is detected on the basis of the relation between the orientation at which the acceleration sensor is fixed and the direction of the acceleration of gravity. The attitude detecting unit 14 detects the attitude of the mobile phone 1 and sends a detected result to the control unit 10. The attitude detecting unit 14 may be configured to send, when a change in the attitude of the mobile phone 1 is detected, information about the change to the control unit 10, or may be configured to detect the attitude at predetermined intervals and send information indicative of the detected attitude to the control unit 10. Alternatively, the attitude detecting unit 14 may be configured to, when receiving from the control unit 10 an instruction to detect information indicative of the attitude, detect information indicative of the attitude and then send the detected result to the control unit 10.

Figure 6:
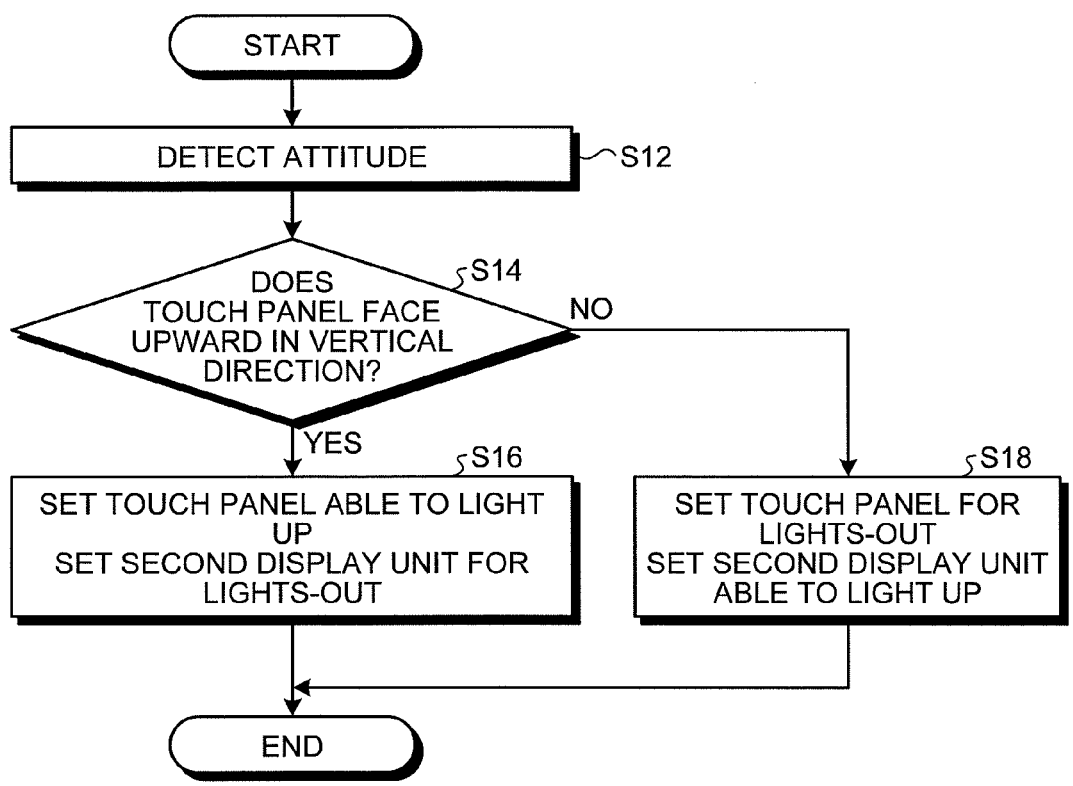
FIG. 6 is a flowchart illustrating operation of the mobile phone.
Figure 7:
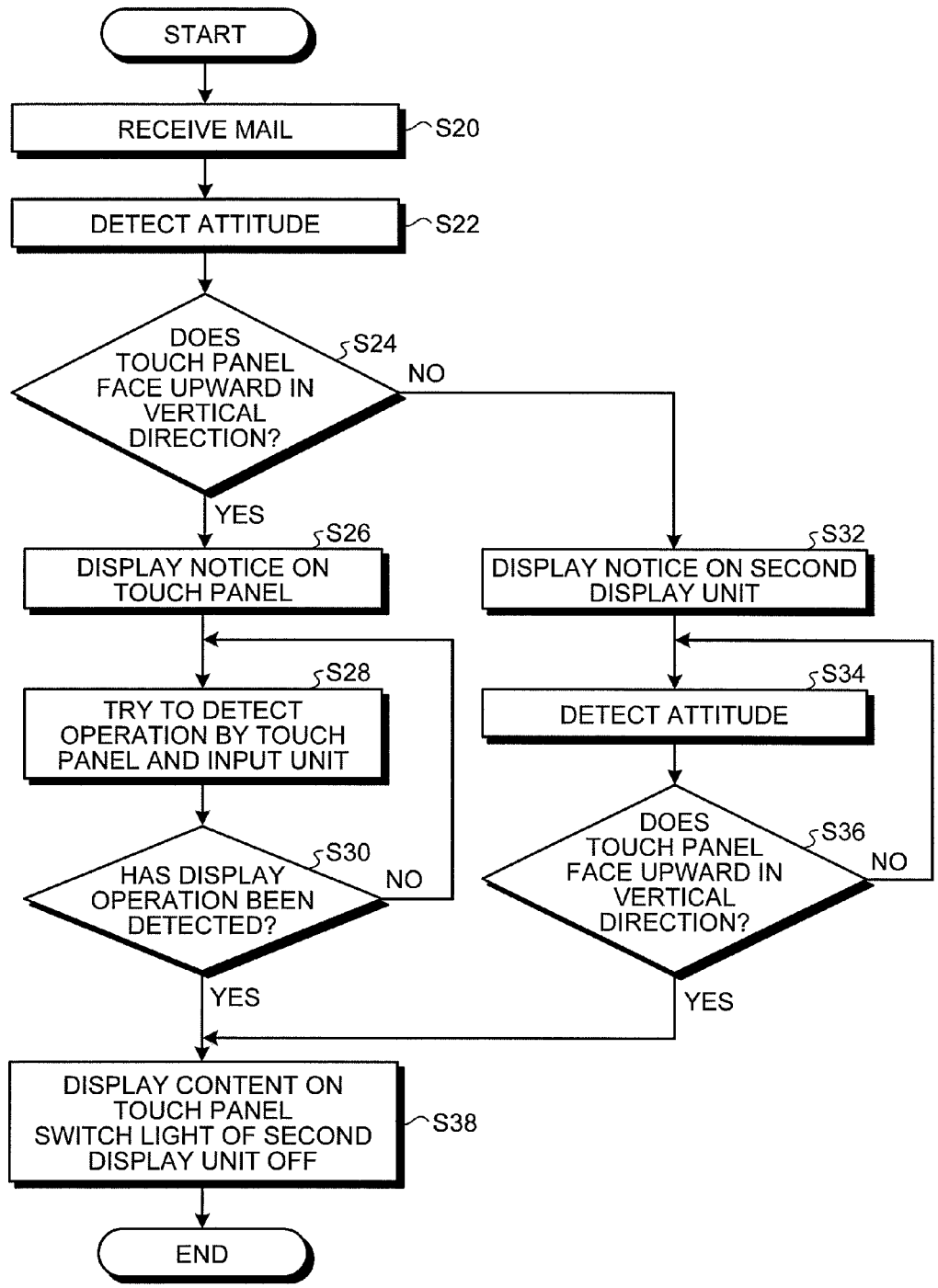
FIG. 7 is a flowchart illustrating operation of the mobile phone.
Figure 8:
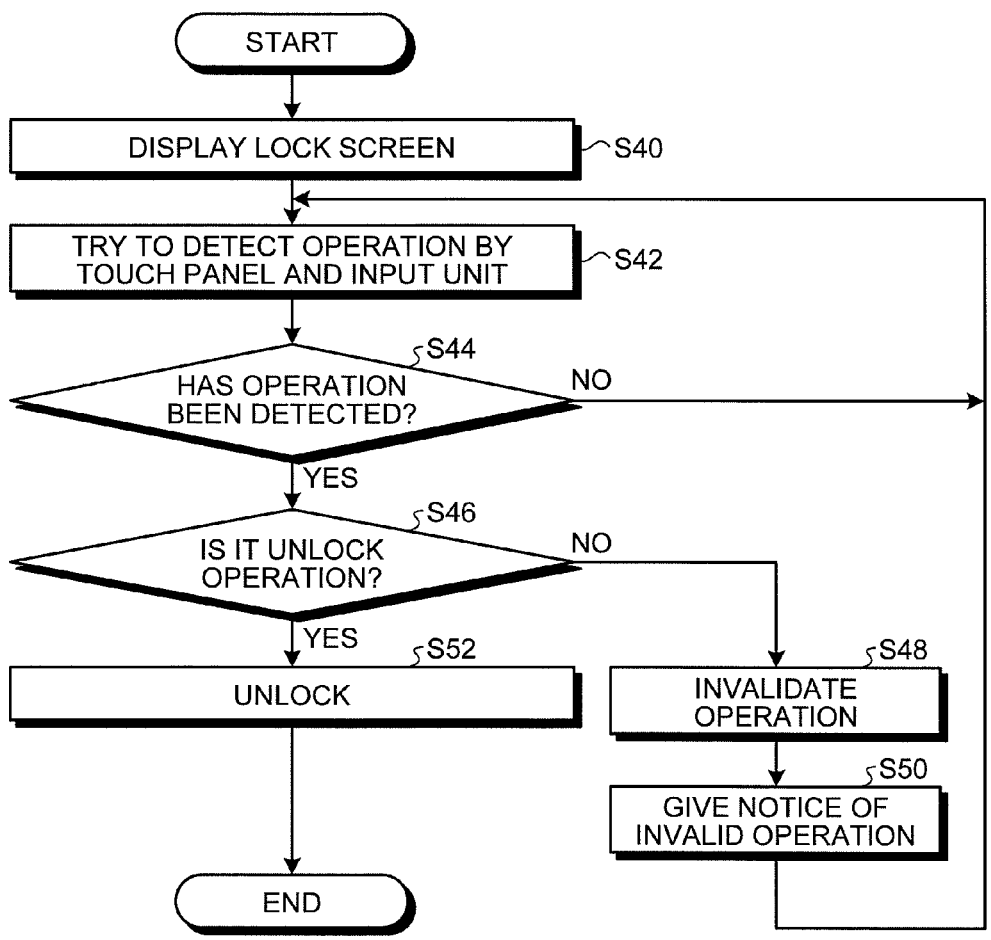
FIG. 8 is a flowchart illustrating operation of the mobile phone.

Then, an example of control performed by the control unit 10 will be explained with reference to FIGS. 6 to 8, in which the control is performed in accordance with the orientation of the housing 20 that is detected by the attitude detecting unit 14, more specifically, the orientation of the touch panel 2 (the first display unit 2B). FIGS. 6 to 8 are flowcharts of operations of the mobile phone. The processing procedures illustrated in FIGS. 6 to 8 are performed repeatedly based on the functions provided by the notice control program 9C and the attitude detecting program 9D.

A basic control executed by the control unit 10 will be explained with reference to FIG. 6. The control unit 10 of the mobile phone 1 performs attitude detection (Step S12). In other words, the control unit 10 detects the attitude of the housing 20 by using the attitude detecting unit 14. When the attitude is detected at Step S12, the control unit 10 determines whether the touch panel faces upward in the vertical direction (Step S14). When the front surface 1A faces upward in the vertical direction with reference to the orientation of the housing 20, the control unit 10 determines that the touch panel 2 faces upward in the vertical direction (first attitude). When the front surface 1A faces downward in the vertical direction, the control unit 10 determines that the touch panel 2 faces downward in the vertical direction (second attitude). The state in which the front surface 1A faces upward in the vertical direction indicates that, when the housing 20 is viewed from the above in the vertical direction, at least a part of the front surface 1A is in view. The state in which the front surface 1A faces downward in the vertical direction indicates that, when the housing 20 is viewed from the above in the vertical direction, at least a part of the back surface 1B is in view. In the present embodiment, the state in which the front surface 1A is parallel to the vertical direction is included in the state in which the front surface 1A faces upward in the vertical direction. In other words, the state in which the surface of the touch panel 2 is parallel to the vertical direction is included in the state in which the touch panel 2 faces upward in the vertical direction (first attitude).

When it is determined that the touch panel 2 faces upward in the vertical direction (first attitude) ("Yes" at Step S14), the control unit 10 sets the touch panel 2 able to light up and sets the second display unit 12 for lights-out (Step S16). In other words, when the attitude detecting unit 14 detects the first attitude, the control unit 10 enables displaying on the touch panel 2 (display unit) and prevents the second display unit 12 (notification unit) from giving a notification. Setting the touch panel 2 able to light up indicates that when an event or the like occurs, an image is displayed on the touch panel 2 and, even when it is in an image undisplay mode, such as a standby mode, the light of the touch panel 2 is switched ON if necessary. In other words, when an event to display an image on the touch panel 2 occurs, the image is displayed. Setting the second display unit 12 for lights-out indicates that, even when an event occurs, the image is not displayed on the second display unit 12.

When it is determined that the touch panel 2 does not face upward in the vertical direction or the touch panel 2 faces downward in the vertical direction (second attitude) ("No" at Step S14), the control unit 10 sets the touch panel 2 for lights-out and sets the second display unit 12 able to light up (Step S18). In other words, when the attitude detecting unit 14 detects the second attitude, the control unit 10 enables the second display unit 12 (notification unit) to give a notification and prevents displaying on the touch panel 2 (display unit). Setting the touch panel 2 for lights-out indicates that, even when an event occurs, the image is not displayed on the touch panel 2. Setting the second display unit 12 able to light up indicated that, when an event or the like occurs, the image is displayed on the second display unit 12 and even it is in an image undisplay mode, such as a standby mode, the light of the second display unit 12 is switched ON if necessary. In other words, when an event to display an image on the second display unit 12 occurs, the image is displayed. When the control unit 10 performs the setting-up indicated by Step S16 or Step S18, the present process is completed.

As described above, the mobile phone 1 (electronic device) according to the present embodiment includes the housing 20; the first display unit 2B (display unit) that is arranged on the front surface 1A (first surface) of the housing 20, always exposed; the second display unit 12 (notification unit) or the light emitting unit 13 (notification unit) that is arranged on a surface of the housing 20 that is different from the front surface 1A, i.e., the back surface 1B or the upper surface 1C (second surface) and that gives a visual notification; the attitude detecting unit 14 that can detect whether the attitude of the housing 20 is the first attitude, in which the front surface 1A faces upward in the vertical direction, or the second attitude, in which the front surface 1A faces downward in the vertical direction; and the control unit 10 that, when the second attitude is detected by the attitude detecting unit 14, prevents displaying on the first display unit 2B and enables the second display unit 12 or the light emitting unit 13 to give a notification. It is allowable to configure the control unit 10 to, when the first attitude is detected by the attitude detecting unit 14, enable displaying on the first display unit 2B and prevents the second display unit 12 or the light emitting unit 13 from giving a notification. Moreover it is allowable to configure the control unit 10 to, when an event to display information on the first display unit 2B occurs while the attitude detecting unit 14 is detecting the second attitude, cause the second display unit 12 or the light emitting unit 13 to give information corresponding to the information to be displayed on the first display unit 2B.

Because the setting process is performed as illustrated in FIG. 6, when, for example, an event occurs in a situation where the settings indicated by Step S16 are done, the control unit 10 displays information indicative of the content of the event on the touch panel 2. When an event occurs in a situation where the settings indicated by Step S18 are done, the control unit 10 displays information indicative of the content of the event on the second display unit 12. If the touch panel 2 faces upward in the vertical direction, the control unit 10 displays an image on the touch panel 2. If the touch panel 2 faces downward in the vertical direction, the control unit 10 displays an image on the second display unit 12.

As described above, the mobile phone 1 switches, depending on the orientation of the housing 20 detected by the attitude detecting unit 14, more specifically, the orientation of the touch panel 2, between a mode in which the touch panel 2 is displayable and a mode in which the second display unit 12 is displayable; therefore, an image is displayed on an appropriate display unit to let the user know about information. With this configuration, for example, even when the mobile phone 1 is placed on a table with the touch panel 2 facing down, i.e., with the touch panel 2 facing the table, the mobile phone 1 can display information about the event on the second display unit 12 and can give the user a notification of the type of the event occurred.

Moreover, when the touch panel 2 faces upward in the vertical direction (first attitude) so that the user can check the touch panel 2, the mobile phone 1 sets the second display unit 12 for lights-out. When the touch panel 2 faces downward in the vertical direction (second attitude), the mobile phone 1 sets the touch panel 2 for lights-out. Either display unit is set for lights-out depending on the attitude of the touch panel 2 so that either display unit that the user will not see is stopped. With this configuration, the power consumed by the mobile phone 1 is reduced. Moreover, when the touch panel 2 faces downward in the vertical direction (second attitude), because the touch panel 2 is set for lights-out, the possibility that anyone else reads the content of the event is reduced. The display area of the second display unit 12 can be smaller than the display area of the first display unit 2B. With this configuration, when the touch panel 2 (the first display unit 2B) faces downward in the vertical direction (second attitude), information about an event is displayed on the second display unit 12. Because the display area of the second display unit 12 is smaller than the display area of the first display unit 2B, the possibility that anyone else reads the content of the event is reduced.

When an event to display information on the first display unit 2B of the touch panel 2 occurs while the attitude detecting unit 14 is detecting the second attitude, the control unit 10 may display an icon on the second display unit 12 in accordance with the information to be displayed on the first display unit 2B. In other words, the control unit 10 may not display the content of the event on the second display unit 12 but display, as information about the event, only the type of the event, for example, information indicating whether the event is an incoming mail, an alarm, or an incoming call. With this configuration, even when an event occurs with the touch panel 2 facing down, the user can prevent anyone else from knowing the content of the event, for example, who is calling, whether the event is an incoming mail, and what is scheduled at the time.

Although the mobile phone 1 can certainly reduce the consumed power by setting the second display unit 12 for lights-out when it is in the first attitude, in the same manner as the process illustrated in FIG. 6, the configuration is not limited thereto. The mobile phone 1 can always set the second display unit 12 able to light up.

Although, as illustrated in the process of FIG. 6, the mobile phone 1 can certainly reduce the consumed power by setting the touch panel 2 for lights-out when the second attitude is detected, the configuration is not limited thereto. It is only necessary for the mobile phone 1 to prevent, when the second attitude is detected, displaying on the touch panel 2. It is allowable, for example, to set the touch panel 2 in such a manner that the panel lights up with no image appearing thereon or to decrease the light-up time to a value shorter than the light-up time when the first attitude is detected (i.e., shift to a stand-by mode immediately to stop displaying of images).

Then, control performed by the control unit 10 at occurrence of an event of an incoming mail will be explained with reference to FIG. 7. An event of an incoming mail is output from the mail function when the control unit 10 performs the process of the mail program 9A, thereby realizing the mail function.

The control unit 10 of the mobile phone 1 receives a mail (Step S20). When a mail is received at Step S20, the control unit 10 performs attitude detection (Step S22). In other words, the control unit 10 detects the attitude of the housing 20 by using the attitude detecting unit 14. When the attitude is detected at Step S22, the control unit 10 determines whether the touch panel 2 faces upward in the vertical direction (Step S24).

When it is determined at Step S24 that the touch panel 2 faces upward in the vertical direction (first attitude) ("Yes" at Step S24), the control unit 10 displays a notice on the touch panel 2 (Step S26). In other words, the control unit 10 displays information about an event indicating that a mail has been received on the touch panel 2 to let the user know that a mail has been received. Depending on the settings, the control unit 10 displays, on the touch panel 2, not only a notice that a mail has been received but also information about the sender, the title, and part or all of the main text. When a notice is displayed at Step S26, the control unit 10 detects an operation by using the touch panel 2 and the input unit 3 (Step S28). In other words, the control unit 10 detects an input operation made either on the touch panel 2 or with the input unit 3. When an operation is detected at Step S28, the control unit 10 determines whether the operation detected at Step S28 is a display operation (Step S30). A display operation is an operation to display the content of the mail that is received at Step S20, such as (all of) the main text. When the control unit 10 determines that no display operation is detected ("No" at Step S30), the process control goes to Step S28. The control unit 10 repeats the processes of Steps S28 and S30 until a display operation is detected at Step S30. When the control unit 10 determines that a display operation is detected ("Yes" at Step S30), the process control goes to Step S38.

When it is determined that the touch panel 2 does not face upward in the vertical direction, i.e., the touch panel 2 faces downward in the vertical direction (second attitude) ("No" at Step S24), the control unit 10 displays a notice on the second display unit 12 (Step S32). In other words, the control unit 10 displays information about an event indicating that a mail has been received on the second display unit 12 to let the user know that a mail has been received. The control unit 10 displays, on the second display unit 12, only information indicating that a mail has been received, for example, an icon indicating that there is an incoming mail. When a notice is displayed at Step S32, the control unit 10 performs attitude detection (Step S34). When the attitude is detected at Step S34, the control unit 10 determines at Step S36 whether the touch panel 2 faces upward in the vertical direction. When the control unit 10 determines that the touch panel 2 does not face upward in the vertical direction (first attitude), i.e., it maintains the second attitude ("No" at Step S36), the process control goes to Step S34. The control unit 10 repeats the processes Steps S34 and S36 until it determines the first attitude at Step S36, i.e., the mobile phone 1 is shifted from the second attitude to the first attitude. When the control unit 10 determines that the touch panel 2 faces upward in the vertical direction (first attitude) ("Yes" at Step S36), the process control goes to Step S38.

When the determination at Step S30 or Step S36 is positive, the control unit 10 displays the content on the touch panel 2 and switches the light of the second display unit 12 OFF (Step S38). In other words, the control unit 10 displays the content of the mail that is received at Step S20 on the touch panel 2 and, if the light of the second display unit 12 is ON, switches the light OFF. In other words, when an event to display information on the touch panel 2 (display unit) occurs while the attitude detecting unit 14 is detecting the second attitude, and then the attitude detecting unit 14 detects a shift to the first attitude, the control unit 10 displays the content of the event on the touch panel 2 (display unit). Moreover, the control unit 10 prevents the second display unit 12 (notification unit), which displays information about an event thereon, from giving a notification. When the control unit 10 performs the process of Step S38, the present process is completed.

Because the mobile phone 1 switches, depending on the orientation of the touch panel 2 at occurrence of an incoming mail, units to give a notice that a mail has been received, i.e., to give a notification of the event, the mobile phone 1 can make a notification through a unit that is easy for the user to check. Moreover, when the touch panel 2 faces downward in the vertical direction (second attitude), because a notice is given through the second display unit 12 indicative of only occurrence of an event of an incoming mail, anyone else cannot read the content of the event, for example, the sender, the title, all or part of the main text.

When an event to display information on the touch panel 2 (display unit) occurs while the attitude detecting unit 14 is detecting the second attitude and then the attitude detecting unit 14 detects a shift to the first attitude, the mobile phone 1 displays the content of the event on the touch panel 2 (display unit). Thus, just by changing the attitude of the housing 20, more specifically, just by changing the touch panel 2 to the first attitude, the user can cause the mobile phone 1 to display the content of the mail. Therefore, various input operations made on the touch panel 2 or with the input unit 3 are not needed to display the content of the mail and easy operation is enabled.

Then, an example of the operation of the mobile phone 1 will be explained with reference to FIG. 8. FIG. 8 is an example of a process that is performed after the determination at Step S36 of FIG. 7 is positive and before the process of Step S38 is performed. FIG. 8 is an example of the operation when the control unit 10 performs a display lock process and an unlock process. The process illustrated in FIG. 8 is performed when the determination made by the control unit 10 at Step S36 is positive.

First, the control unit 10 displays a lock screen on the touch panel 2 (Step S40). The lock screen is a screen indicating that the screen is locked. The lock screen can include a message displayed thereon such as "please enter an unlock operation" or "please enter a password" to let the user know that it is necessary to enter an unlock operation to display the content of a mail.

When the lock screen is displayed at Step S40, the control unit 10 tries to detect an operation by using the touch panel 2 and the input unit 3 (Step S42). In other words, the control unit 10 tries to detect an input operation made either on the touch panel 2 or with the input unit 3. When an operation is tried to detect at Step S42, the control unit 10 determines at Step S44 whether an operation is found, i.e., an operation made either on the touch panel 2 or with the input unit 3 is detected. If the control unit 10 determines that no operation is found ("No" at Step S44), the process control goes to Step S42. In other words, the control unit 10 repeats the processes of Steps S42 and S44 until an operation is detected at Step S42.

If an operation is found ("Yes" at Step S44), the control unit 10 determines whether the operation detected at Step S42 is an unlock operation (Step S46). An unlock operation is an operation assigned with an unlock process by the user's settings or the default settings. When it is determined at Step S46 that the operation is not an unlock operation ("No" at Step S46), the control unit 10 determines the operation is invalid, i.e., the detected operation is invalid and assumes that no operation is received (Step S48). When the operation is determined to be invalid at Step S48, the control unit 10 gives a notice of an invalid operation, for example, displays on the touch panel 2 a message that the operation is not an unlock operation (Step S50). When the control unit 10 performs the process of Step S50, the process control goes to Step S42.

When the operation is determined to be an unlock operation ("Yes" at Step S46), the control unit 10 unlocks the screen, i.e., sets the touch panel 2 able to display the content of a mail (Step S52), and the present process is completed. When the control unit 10 performs the process of FIG. 8, the process control goes to Step S38.

In other words, when an event to display information on the first display unit 2B occurs while the attitude detecting unit 14 is detecting the second attitude and then the attitude detecting unit 14 detects a shift to the first attitude, the control unit 10 displays a notice for requesting unlock on the first display unit 2B. When an unlock operation made on the touch panel 2 or with the operating unit of the input unit 3 is detected, the control unit 10 displays the content of the event on the first display unit 2B.

As illustrated in FIG. 8, when an event to display information on the touch panel 2 (display unit) occurs while the attitude detecting unit 14 is detecting the second attitude and then the attitude detecting unit 14 detects a shift to the first attitude, the mobile phone 1 performs the screen lock process and then prevents displaying the content of an event on the touch panel 2 until an unlock operation is received; therefore, even when anyone else who recognizes occurrence of an event shifts the mobile phone 1 to the first attitude, he/she cannot read the content of the event (the content of the mail) easily. Therefore, the possibility of that anyone else accidentally reads the content of the event is reduced certainly.

Although the mobile phone 1 of the present embodiment includes the first display unit 2B and the second display unit 12 and it selects, depending on the detected result of the attitude detecting unit 14, either the first display unit 2B or the second display unit 12 and then displays an image on the selected display unit, the configuration is not limited thereto. For example, as illustrated in. FIGS. 7 and 8, when an event to display information on the touch panel 2 (display unit) occurs while the attitude detecting unit 14 is detecting the second attitude and then the attitude detecting unit 14 detects a shift to the first attitude, the screen lock process is performed and then displaying the content of the event is prevented until an unlock operation is received. This process can be used regardless whether the second display unit 12 is present. In other words, it is allowable to configure the mobile phone 1 without the second display unit 12 and to perform the processes illustrated in FIGS. 7 and 8. With this configuration, when an event occurs while the touch panel 2 faces down, even if someone else shifts the mobile phone 1 to the first attitude, he/she cannot read the content of the event (the contents of the mail) easily. Regarding the process that is performed after the process at Step S30 illustrated in FIG. 7 is determined to be positive and is performed before the process control goes to Step S38, it is allowable to skip the process illustrated in FIG. 8. It is assumed that placing the mobile phone 1 in the first attitude indicates that the user is less cautious about someone else who reads the content of an event as compared with placing the mobile phone 1 in the second attitude. Therefore, by skipping the unlock operation illustrated in FIG. 8, the operability will be improved.

Figure 9:
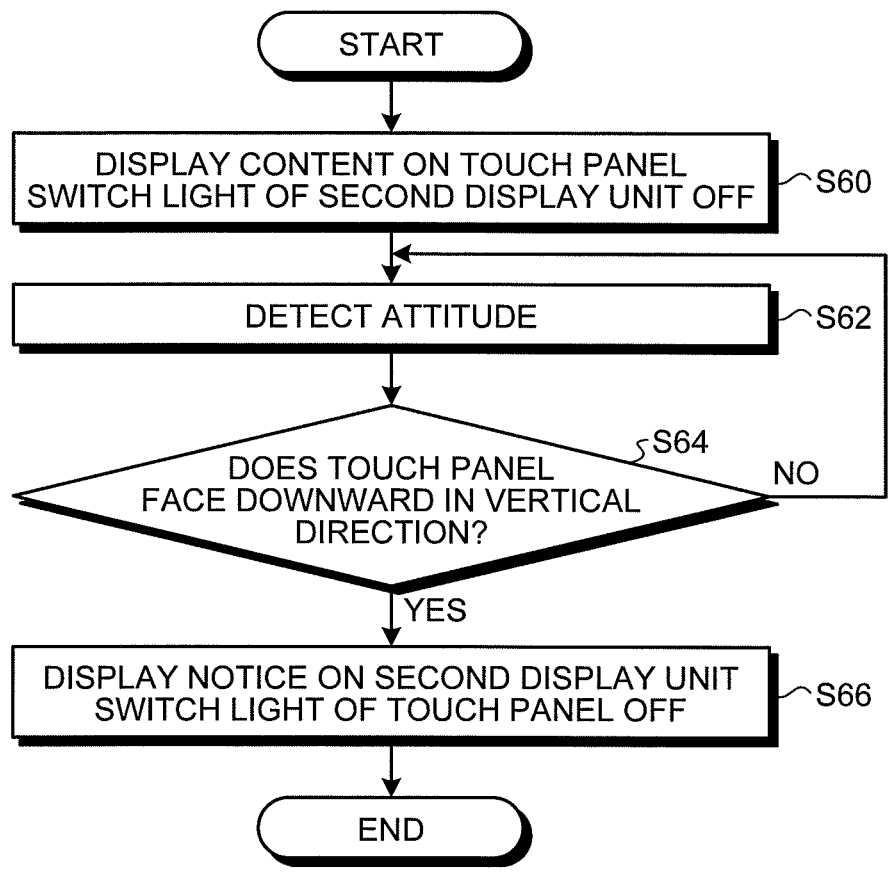
FIG. 9 is a flowchart illustrating operation of the mobile phone.

Then, an example of the operation of the mobile phone 1 will be explained with reference to FIG. 9. The process illustrated in FIG. 9 is performed when the mobile phone 1 is in the first attitude and the light of the touch panel 2 is ON.

The control unit 10 displays the content on the touch panel 2 and switches the light of the second display unit 12 OFF (Step S60). In other words, the control unit 10 displays the content on the touch panel 2 by a function that is realized by processing various programs and switches the light of the second display unit 12 OFF. When an input operation is made on the touch panel 2 or with the input unit 3, the control unit 10 switches the content to be displayed on the touch panel 2 in accordance the input operation.

When, at Step S60, the content is displayed on the touch panel 2 and the light of the second display unit 12 is switched OFF, the control unit 10 performs attitude detection (Step S62). When the attitude is detected at Step S62, the control unit 10 determines whether the touch panel 2 faces downward in the vertical direction (Step S64). When the control unit 10 determines at Step S64 that the touch panel 2 does not face downward in the vertical direction (second attitude), i.e., it maintains the first attitude ("No" at Step S64), the process control goes to Step S62. As described above, the control unit 10 repeats the processes of Steps S62 and S64 until the second attitude is determined at Step S64, i.e., the mobile phone 1 shifts from the first attitude to the second attitude.

When it is determined that the touch panel 2 faces downward in the vertical direction (second attitude) ("Yes" at Step S64), i.e., it is shifted from the first attitude to the second attitude, the control unit 10 displays a notice on the second display unit 12 and switches the light of the touch panel 2 OFF (Step S66). The notice that is displayed on the second display unit 12 is, for example, an icon indicative of the type of an activating program, and an image indicative of completion of display. It is allowable to configure the control unit 10 to stop the program-processing and realizing function and displays a notice thereof at Step S66. When the control unit 10 performs the process of Step S66, the present process is completed. In other words, the control unit 10 activates an application (function) while the attitude detecting unit 14 is detecting the first attitude. When the attitude detecting unit 14 detects a shift to the second attitude while the application is running, the control unit 10 terminates the application and switches the light of the first display unit 2B OFF.

When it is determined that it is shifted from the first attitude to the second attitude while various function are running in the first attitude, the mobile phone 1 switches the light of the touch panel 2 OFF and displays a notice thereof on the second display unit 12; therefore, when the touch panel 2 faces down, displaying an image on the touch panel 2 is stopped automatically. With this configuration, the consumed power is reduced.

When it is determined that it is shifted from the first attitude to the second attitude while various functions are running in the first attitude, the mobile phone 1 stops the program-processing and realizing function; therefore, the user can stop the function without entering a completion operation. Therefore, it is possible to stop a running function quickly and easily.

Although, in the above embodiment, the present invention is applied to an electronic device that has a touch panel as a display unit, the present invention can be applied to an electronic device that has, as a display unit, a simple display panel on which no touch sensor is imposed.

Although, in the above embodiment, the second display unit 12 is used as a notification unit to give a notification instead of the touch panel 2 when it is in the second attitude, it is allowable to use the light emitting unit 13. When an event occurs, the light emitting unit 13 lets the user visually know occurrence of the event by illumination. When an event occurs to display an image on the touch panel 2 as a notice for the user, the mobile phone 1 can let the user know occurrence of the event, etc., by causing the light emitting unit 13 to emit light without displaying an image on the touch panel 2 when it is in the second attitude.

Moreover, in the same manner as the second display unit 12 and the light emitting unit 13, the notification unit can be arranged on any surface other than the surface on which the touch panel 2 is arranged (the front surface 1A). When the notification unit is arranged on a surface that is different from the surface on which the touch panel 2 is arrange and the touch panel 2 faces downward in the vertical direction, i.e., it is in the second attitude, basically, the mobile phone 1 causes the notification unit, which is in view from the above in the vertical direction, to give a notification to let the user know occurrence of an event, etc. Similar to the second display unit 12, the notification unit may be arranged on the surface opposite to the surface on which the touch panel 2 is arranged. With this arrangement, when the touch panel 2 faces downward in the vertical direction or it is in the second attitude, the notification unit is more likely to be in view from the above in the vertical direction. Although, in the above embodiment, the attitude detecting unit 14 is an acceleration sensor or a gyrosensor, the attitude detecting unit 14 can be an ambient light sensor or a proximity sensor that is arranged on an arbitrary surface of the housing (for example, the front surface 1A, etc.). An ambient light sensor detects the attitude of the housing by the ambient light (if a surface on which the ambient light sensor is arranged faces upward in the vertical direction, it is bright, while the surface faces downward in the vertical direction, it is dark). A proximity sensor can detect the attitude of the housing depending on whether an object is nearby. It is allowable to increase the accuracy of attitude detection by combining any of an ambient light sensor, a proximity sensor, an acceleration sensor, and a gyrosensor.

Second Embodiment

Figure 10:
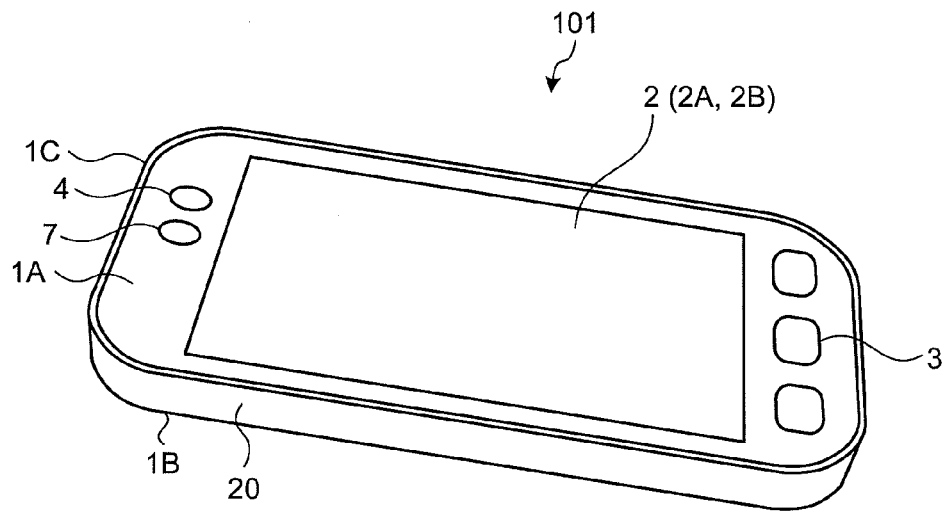
FIG. 10 is a perspective view of a mobile phone according to a second embodiment.
Figure 11:
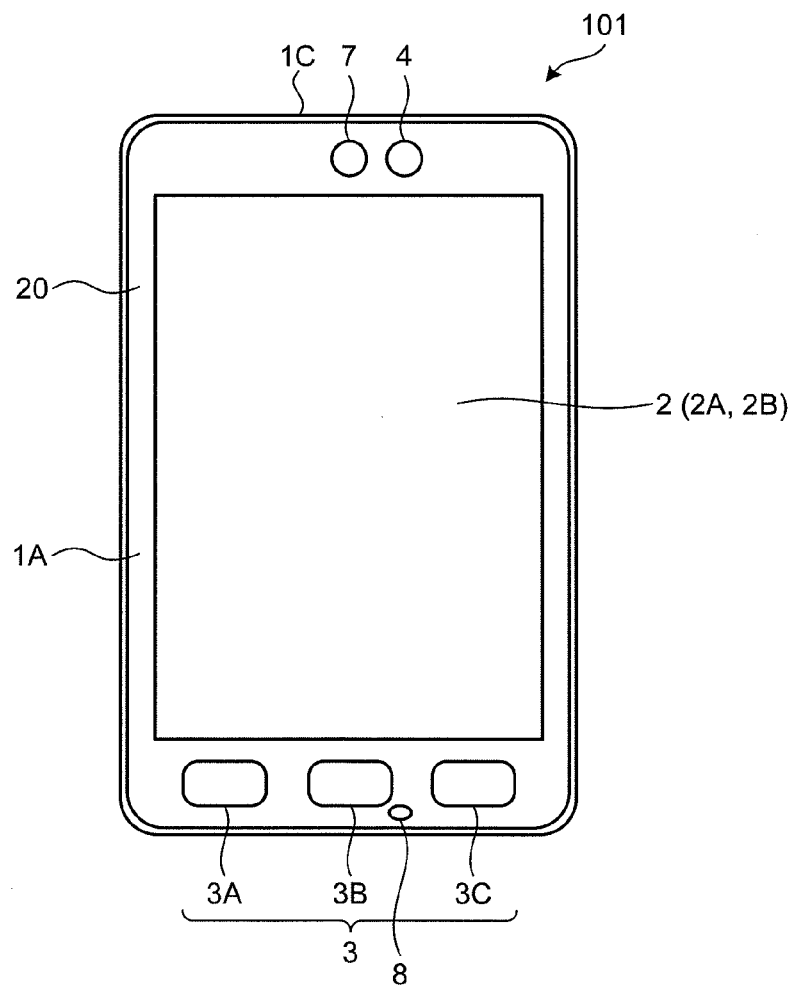
FIG. 11 is a front view of the mobile phone.
Figure 12:
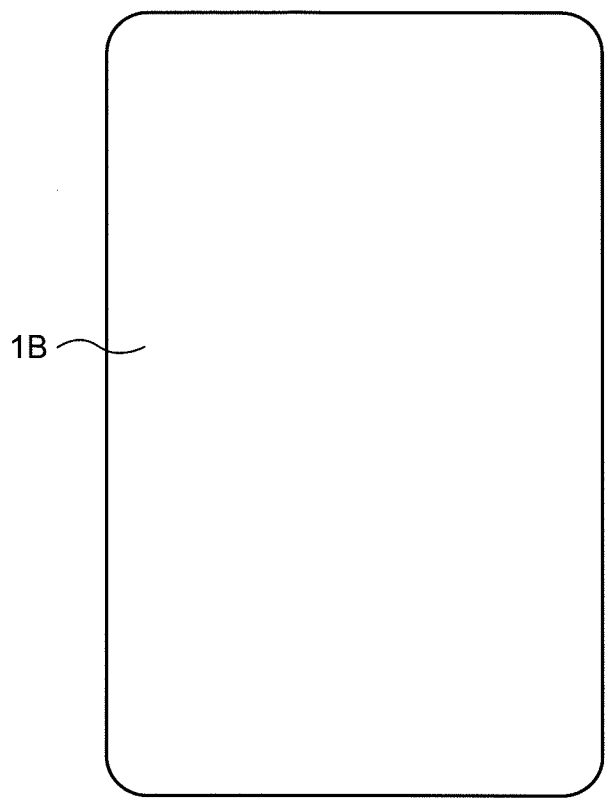
FIG. 12 is a back view of the mobile phone.

Now, a mobile phone 101, which is an example of an electronic device according to the second embodiment, will be explained with reference to FIGS. 10 to 12. FIG. 10 is a perspective view of the mobile phone 101. FIG. 11 is a front view of the mobile phone 101. FIG. 12 is a back view of the mobile phone. The basic configuration of a mobile phone 101 illustrated in FIGS. 10 to 12 is almost the same as the configuration of the mobile phone 1 except some components. The components of the mobile phone 101 that are the same as those of the mobile phone 1 are denoted with the same reference numbers and the detailed explanation is not repeated. The characteristic matters of the mobile phone 101 are explained below in detail.

As illustrated in FIGS. 10 to 12, the mobile phone 101 includes the substantially hexahedral housing 20 in which two surfaces thereof are larger than the other surfaces thereof. As illustrated in FIG. 11, the mobile phone 101 includes, on the front surface 1A of the housing 20, the touch panel 2 that includes the touch sensor 2A and the display unit 2B; the input unit 3; a shielded-state detecting unit 4; the receiver 7; and the microphone 8. The configuration of the touch panel 2, the input unit 3, the receiver 7, and the microphone 8 is the same as the configuration of the respective units of the mobile phone 1. The shielded-state detecting unit 4 is arranged at a position adjacent to one end in the longitudinal direction of the front surface 1A. The shielded-state detecting unit 4 detects whether the display unit 2B (the touch panel 2), which is provided on the same surface, is shielded and then outputs a detection signal. As described later, the shielded-state detecting unit 4 can be configured with, for example, a proximity sensor. When an object comes closer, it detects that the display unit 2B is shielded.

Figure 13:
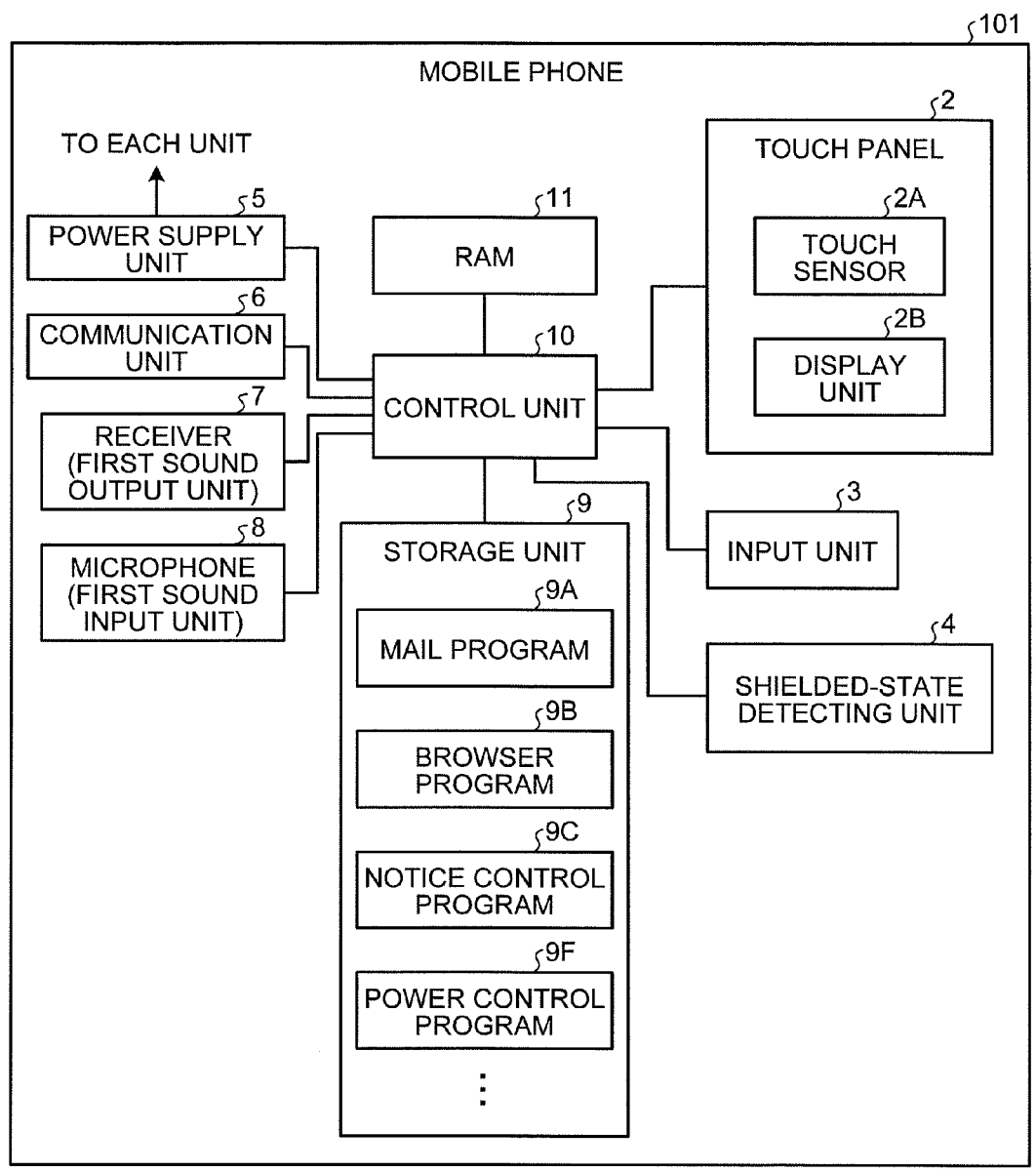
FIG. 13 is a block diagram of the mobile phone.

FIG. 13 is a block diagram of the mobile phone 101. As illustrated in FIG. 13, the mobile phone 101 includes the touch panel 2, the input unit 3, the shielded-state detecting unit 4, the power supply unit 5, the communication unit 6, the receiver (first sound output unit) 7, the microphone (first sound input unit) 8, the storage unit 9, the control unit 10, and the RAM 11. The touch panel 2, the input unit 3, the power supply unit 5, the communication unit 6, the receiver (first sound output unit) 7, the microphone (first sound input unit) 8, the storage unit 9, the control unit 10, and the RAM (Random Access Memory) 11 are the same as those of the mobile phone 1.

The shielded-state detecting unit 4 can be configured, for example, with a proximity sensor. A proximity sensor is a measure for measuring the distance to an object that is in a predetermined direction. The proximity sensor includes a transmitting unit that is arranged on the front surface 1A of the housing 20 to transmit a measurement wave, such as an infrared ray, an ultrasonic wave, and laser light; and a receiving unit that is arranged on the front surface 1A of the housing 20 to receive the measurement wave. When the measurement wave emitted from the transmitting unit is reflected from a target object, the receiving unit receives the reflected wave. The proximity sensor calculates the distance between the proximity sensor and the target object based on the intensity of the measurement wave received by the receiving unit, the angle of incidence of the measurement wave, the time between when the transmitting unit transmits the measurement wave and when the receiving unit receives it. When the proximity sensor detects an object nearby, the shielded-state detecting unit 4 outputs a detection signal to the control unit 10 to indicate that the display unit 2B (the touch panel 2) is shielded.

The storage unit 9 stores therein programs and data that are used when the control unit 10 performs processes. Programs stored in the storage unit 9 include the mail program 9A, the browser program 9B, the notice control program 9C, a power control program 9F, etc. The power control program 9F provides a function to realize a power control function including a power saving mode.

The control unit 10 realizes, by executing the power control program 9F, the function of controlling the power supplied from the power supply unit 5 to each unit of the mobile phone 101. If no input operation is made on the touch panel 2 or with the input unit 3 for a predetermined time, the control unit 10 shifts the mobile phone 101 to a low power consumption mode to reduce the consumed power. During the low power consumption mode, the control unit 10 performs power saving control of each unit that includes power-saving control of the touch panel 2 (for example, switching the light of the display unit 2B OFF and switching the touch sensor 2A OFF). Moreover, when no input operation is made for a predetermined time, the control unit 10 switches the shielded-state detecting unit 4 OFF.

For example, in a state where an mobile phone 101 is inside a bag or a pocket, the display unit 2B is covered by something, or the housing is placed on a desk or the like with the front surface 1A facing down, the user cannot see the screen of the display unit 2B (cannot operate the screen). Suppose that, in the above situation, an event occurs during the low power consumption mode that is not caused by a user operation (for example, an incoming mail, an incoming voice call, an alarm, etc.), and then the low power consumption mode is set OFF and displaying on the display unit 2B is perform. Although the user does not use the mobile phone 101, the low power consumption mode is set OFF; therefore, a power is consumed wastefully. Therefore, in the present embodiment, when an event that is not caused by a user operation occurs during the low power consumption mode, the control unit 10 performs control to maintain the low power consumption mode if the shielded-state detecting unit 4 detects that the display unit 2B is shielded.

Figure 14:
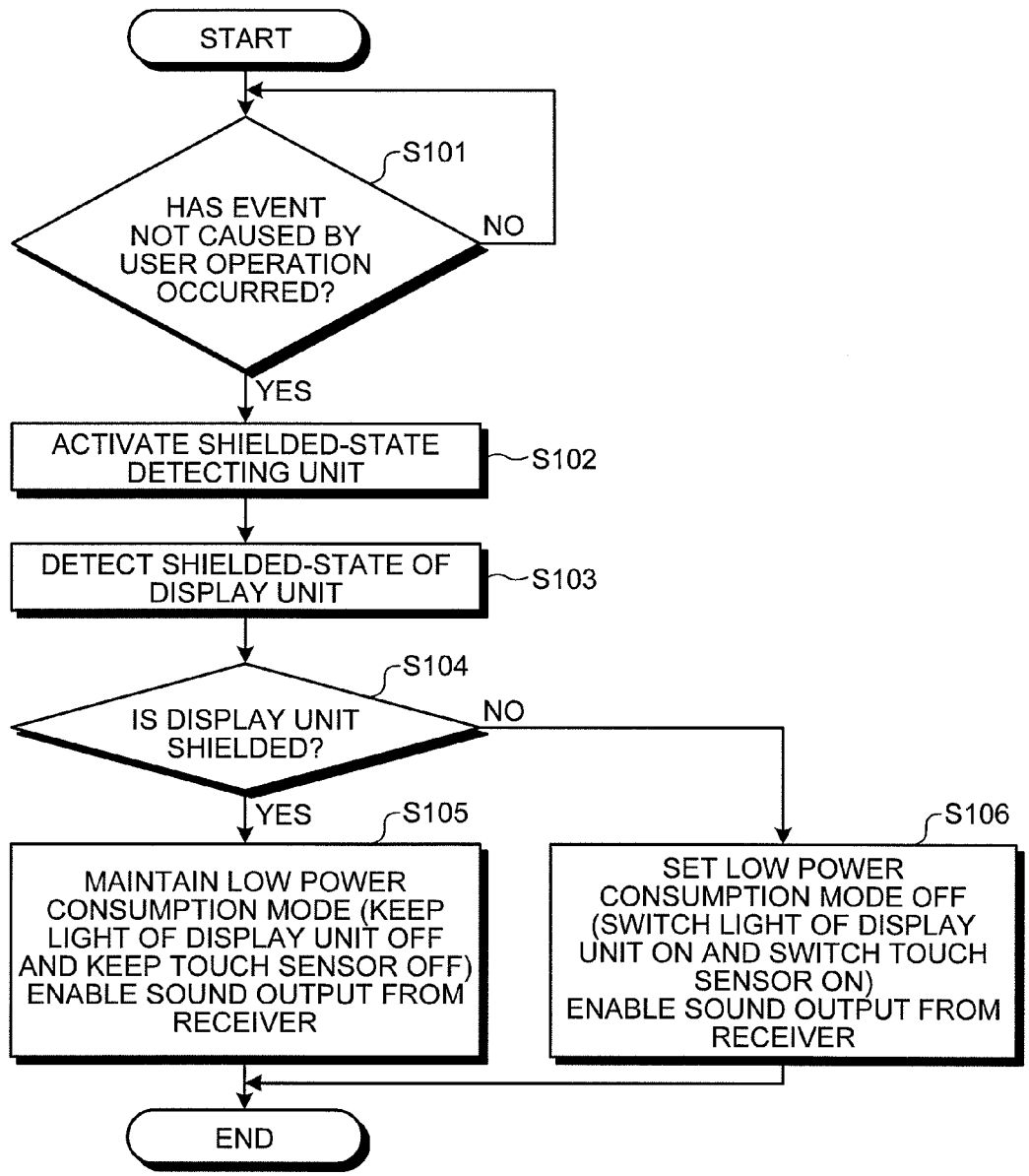
FIG. 14 is a flowchart illustrating an example of a process performed during a low power consumption mode.

FIG. 14 is a flowchart of an example of a process performed by the control unit 10 during the low power consumption mode. In FIG. 14, mobile phone 101 is in the low power consumption mode (the light of the display unit 2B is OFF and the touch sensor 2A is OFF). First, the control unit 10 determines whether an event occurs that is not caused by a user operation (for example, an incoming mail, an incoming voice call, an alarm, etc.) (Step S101). When an event that is not caused by a user operation occurs (Yes at Step S101), the control unit 10 activates the shielded-state detecting unit 4 (Step S102) and causes the shielded-state detecting unit 4 to detect whether the display unit 2B is shielded (Step S103). When the shielded-state detecting unit 4 completes the detection, the control unit 10 switches the shielded-state detecting unit 4 OFF.

When the display unit 2B is shielded ("Yes" at Step S104), the control unit 10 maintains the low power consumption mode (keeps the light of the display unit 2B OFF and keeps the touch sensor 2A OFF) and enables sound output of the receiver 7 and sound input of the microphone 8 (Step S105). On the other hand, when the display unit 2B is not shielded ("No" at Step S104), the control unit 10 sets the low power consumption mode OFF (switches the light of the display unit 2B ON and switches the touch sensor 2A ON) and enables sound output of the receiver 7 and sound input of the microphone 8 (Step S106).

Although the shielded-state detecting unit 4 is arranged on the front surface 1A of the housing 20, the shielded-state detecting unit 4 can be arranged on the back surface 1B. If the shielded-state detecting unit 4 is on the back surface 1B, when the shielded-state detecting unit 4 detects no object nearby, the display unit 2B is detected to be shielded.

As described above, the mobile phone 101 according to the present embodiment includes the housing 20; the display unit 2B that is arranged on the first surface (front surface) 1A of the housing 20 with its surface exposed; the shielded-state detecting unit 4 that can detect whether the display unit 2B is shielded; and the control unit 10 that performs power control of the mobile phone 101 and performs the low power consumption mode. When an event occurs during the low power consumption mode that is not caused by a user operation, the control unit 10 maintains the low power consumption mode if the shielded-state detecting unit 4 detects that the display unit 2B is shielded. Therefore, when an event occurs while the display unit 2B is shielded (hidden), the low power consumption mode is maintained so that wastefully consumed power is reduced.

When an event occurs during the low power consumption mode that is not caused by a user operation, the control unit 10 activates the shielded-state detecting unit 4. Because the shielded-state detecting unit 4 is activated only when an event has occurred, the power consumed by the shielded-state detecting unit 4 is reduced.

Because the low power consumption mode includes at least the low power control of the display unit 2B, it is possible to reduce a large amount of power consumed by the display unit.

Because an event that is not caused by a user operation is at least one of an incoming voice call, an incoming mail, and an alarm, it is possible to reduce the consumed power when an event, such as an incoming voice call, an incoming mail, and an alarm, occurs.

If the shielded-state detecting unit 4 is arranged on the first surface (front surface) 1A of the housing 20, the display unit 2B is detected to be shielded when an object nearby is detected; therefore, with the configuration in which the shielded-state detecting unit 4 is arranged on the first surface (front surface) 1A of the housing 20, it is possible to detect whether the display unit 2B is shielded.

If the shielded-state detecting unit 4 is arranged on the second surface (back surface) 1B of the housing, the display unit 2B is detected to be shielded when no object is detected nearby; therefore, with the configuration in which the shielded-state detecting unit 4 is arranged on the second surface (back surface) 1B of the housing 20, it is possible to detect whether the display unit 2B is shielded.

Although, in the second embodiment, a proximity sensor is used as the shielded-state detecting unit 4, it is allowable to use a light sensor (ambient light sensor) to detect whether the display unit 2B is shielded. Moreover, it is allowable to use a proximity sensor and a light sensor in a combined manner.

Third Embodiment

Figure 15:
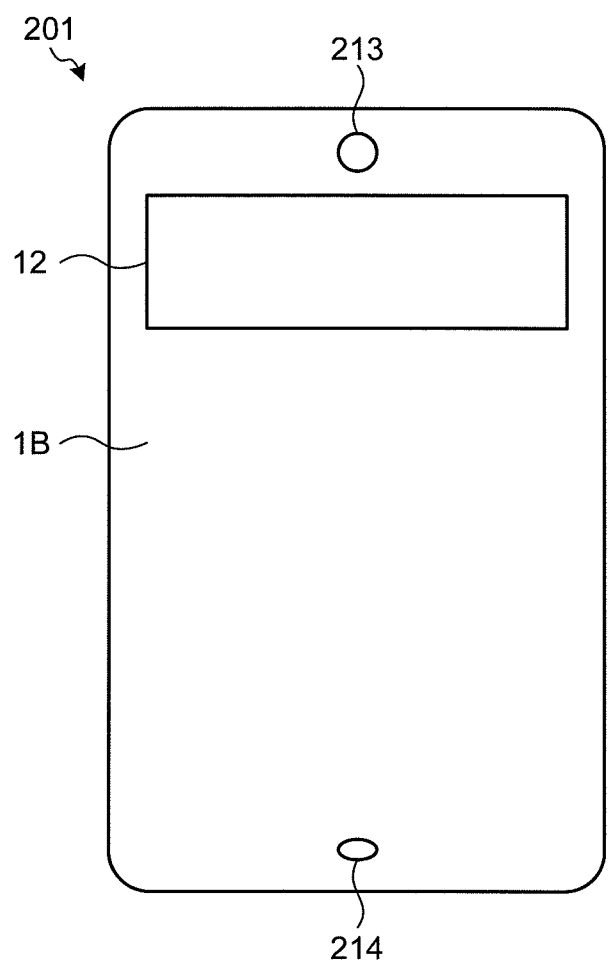
FIG. 15 is a back view of a mobile phone according to a third embodiment.

A mobile phone 201 will be explained with reference to FIGS. 15 to 17 according to the third embodiment. FIG. 15 is a back view of the mobile phone 201 according to the third embodiment. The configuration of the front surface 1A of the housing 20 is the same as that in the second embodiment (see FIGS. 10 and 11) and the explanation is not repeated. As illustrated in FIG. 15, in the mobile phone 201, the second display unit 12, a second receiver 213, and a second microphone 214 are arranged on the back surface 1B of the housing 20, which is opposite to the front surface 1A. The second display unit 12 is an oblong member that extends in a short-side direction in an upper area of the back surface 1B. The second display unit 12 is smaller than the display unit 2B.

The second microphone 214 is arranged at one end of the back surface 1B in the longitudinal direction. The second receiver 213 is arranged at the other end of the back surface 1B in the longitudinal direction. In other words, the second receiver 213 and the second microphone 214 are arranged at different ends in the longitudinal direction, respectively. The second display unit 12 is always exposed and cannot be hidden in the housing 20. The area of the second display unit 12 can be equal to the area of the display unit 2B. It is allowable to overlap a touch sensor on the second display unit 12, thereby forming a touch panel.

Figure 16:
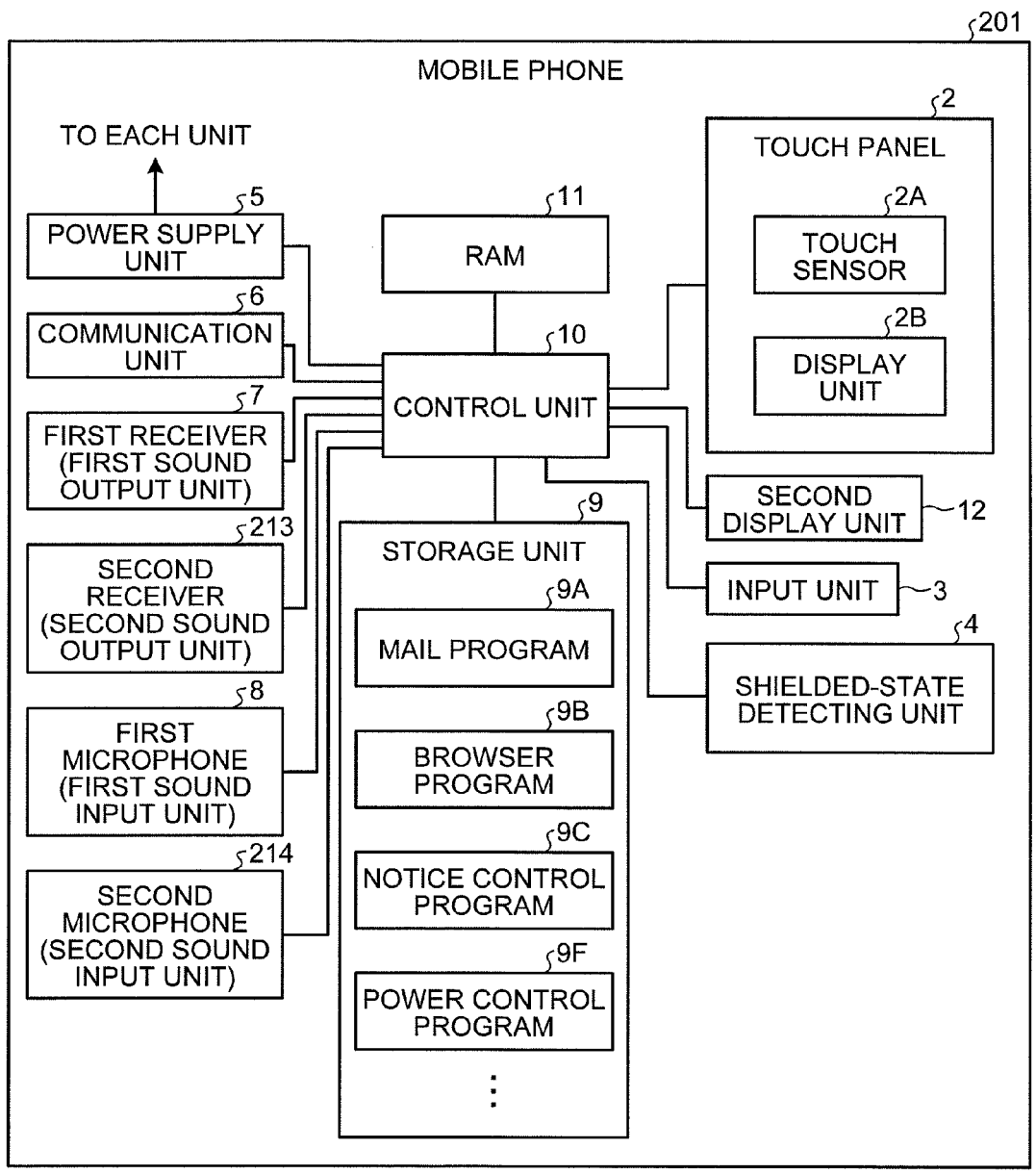
FIG. 16 is a block diagram of the mobile phone.

FIG. 16 is a block diagram of the mobile phone 201. The components of FIG. 16 that have the same functions as those of FIG. 13 are denoted with the same reference numbers and the explanations of the same components are not repeated.

Different matters are mainly explained below. The mobile phone 201 includes not only the components of the second embodiment (FIG. 13) but also the second display unit 12, the second receiver (second sound output unit) 213, and the second microphone (second sound input unit) 214. The configuration of the second display unit 12 is the same as the configuration of the second display unit 12 of the mobile phone 1. The second receiver 213 outputs a sound signal received from the control unit 10 as a sound. The second microphone 214 converts a voice of a user, etc., into a sound signal and outputs the sound signal to the control unit 10.

Figure 17:
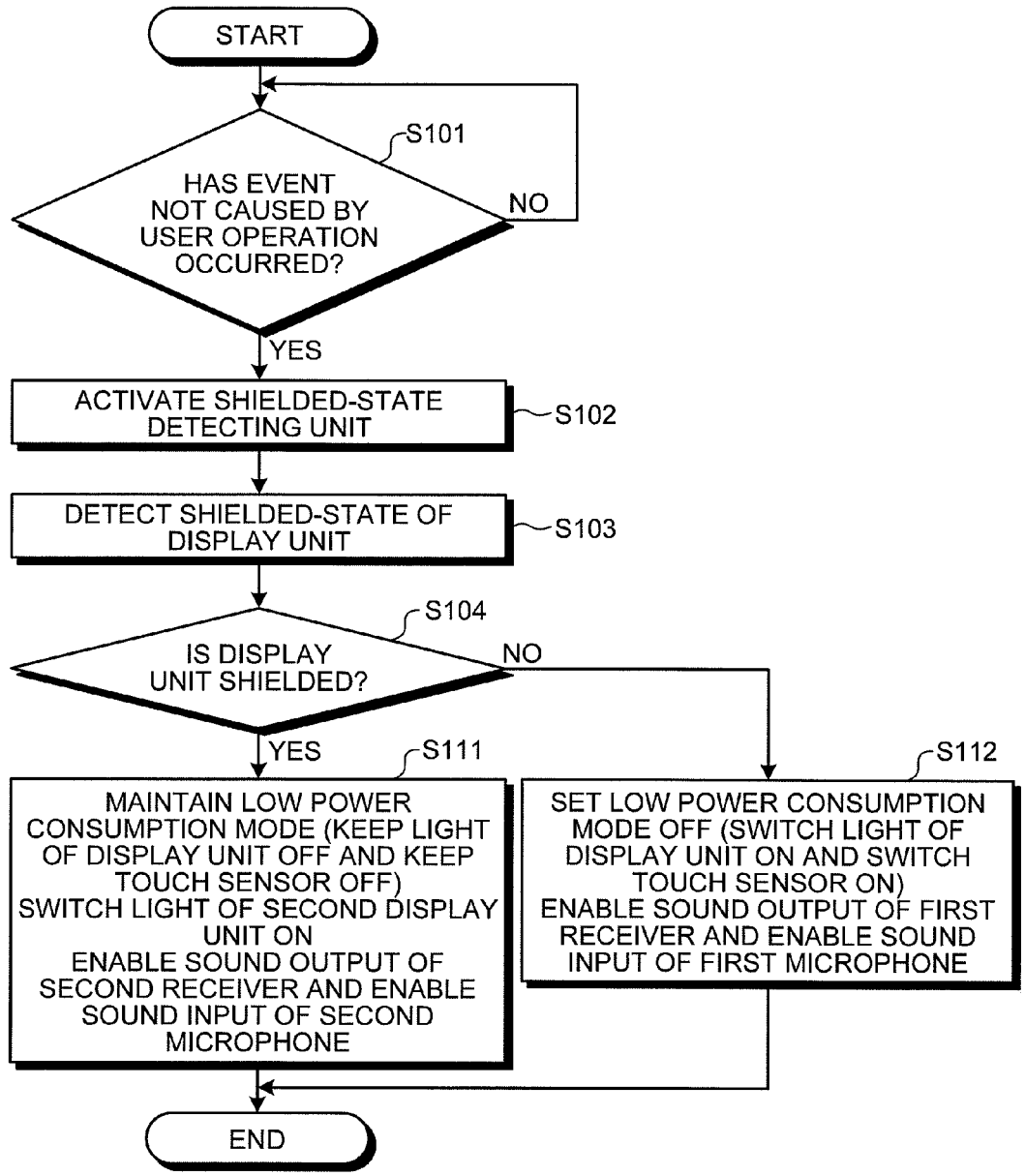
FIG. 17 is a flowchart illustrating an example of a process performed during a low power consumption mode.

FIG. 17 is a flowchart of an example of a process performed by the control unit 10 during the low power consumption mode. The same steps of FIG. 17 as those of FIG. 14 are denoted with the same numbers. In FIG. 17, the mobile phone 201 is in the low power consumption mode (the light of the display unit 2B is OFF and the touch sensor 2A is OFF). First, the control unit 10 determines whether an event occurs that is not caused by a user operation (for example, an incoming mail, an incoming voice call, an alarm, etc.) (Step S101). When an event occurs that is not caused by a user operation ("Yes" at Step S101), the control unit 10 activates the shielded-state detecting unit 4 (Step S102) and causes the shielded-state detecting unit 4 to detect whether the display unit 2B is shielded (Step S103). When it is detected that the display unit 2B is shielded ("Yes" at Step S104), the control unit 10 maintains the low power consumption mode (keeps the light of the display unit 2B OFF and keeps the touch sensor 2A OFF), switches the light of the second display unit 12 ON, enables sound output from the second receiver 213 and sound input from the second microphone 214 (Step S111). On the other hand, when the display unit 2B is not shielded ("No" at Step S104), the control unit 10 sets the low power consumption mode OFF (switches the light of the display unit 2B ON and switches the touch sensor 2A ON), and enables sound output of the first receiver 207 and sound input of the first microphone 208 (Step S112).

As described above, the mobile phone 201 includes the second display unit 12 that is arranged on the second surface (back surface) 1B of the housing 20. When an event occurs during the low power consumption mode that is not caused by a user operation, the control unit 10 enables displaying on the second display unit 12 if the shielded-state detecting unit 4 detects that the display unit 2B is shielded. There is the possibility that the display unit 2B is out of view but the second display unit 12 is in view. If the second display unit 12 is in view, displaying on the second display unit 12 is enabled.

The mobile phone 201 further includes the first receiver 207 that is arranged on the first surface (front surface) 1A of the housing 20 and the second receiver 213 that is arranged on the second surface (back surface) 1B of the housing 20. When an event occurs during the low power consumption mode that is not caused by a user operation, the control unit 10 prevents sound output from the first receiver 207 and enables sound output from the second receiver 213 if the shielded-state detecting unit 4 detects that the display unit 2B is shielded. There is the possibility that the display unit 2B is out of view but the second display unit 12 is in view. If the second display unit 12 is in view, sound output from the back surface is enabled.

Fourth Embodiment

Figure 18:
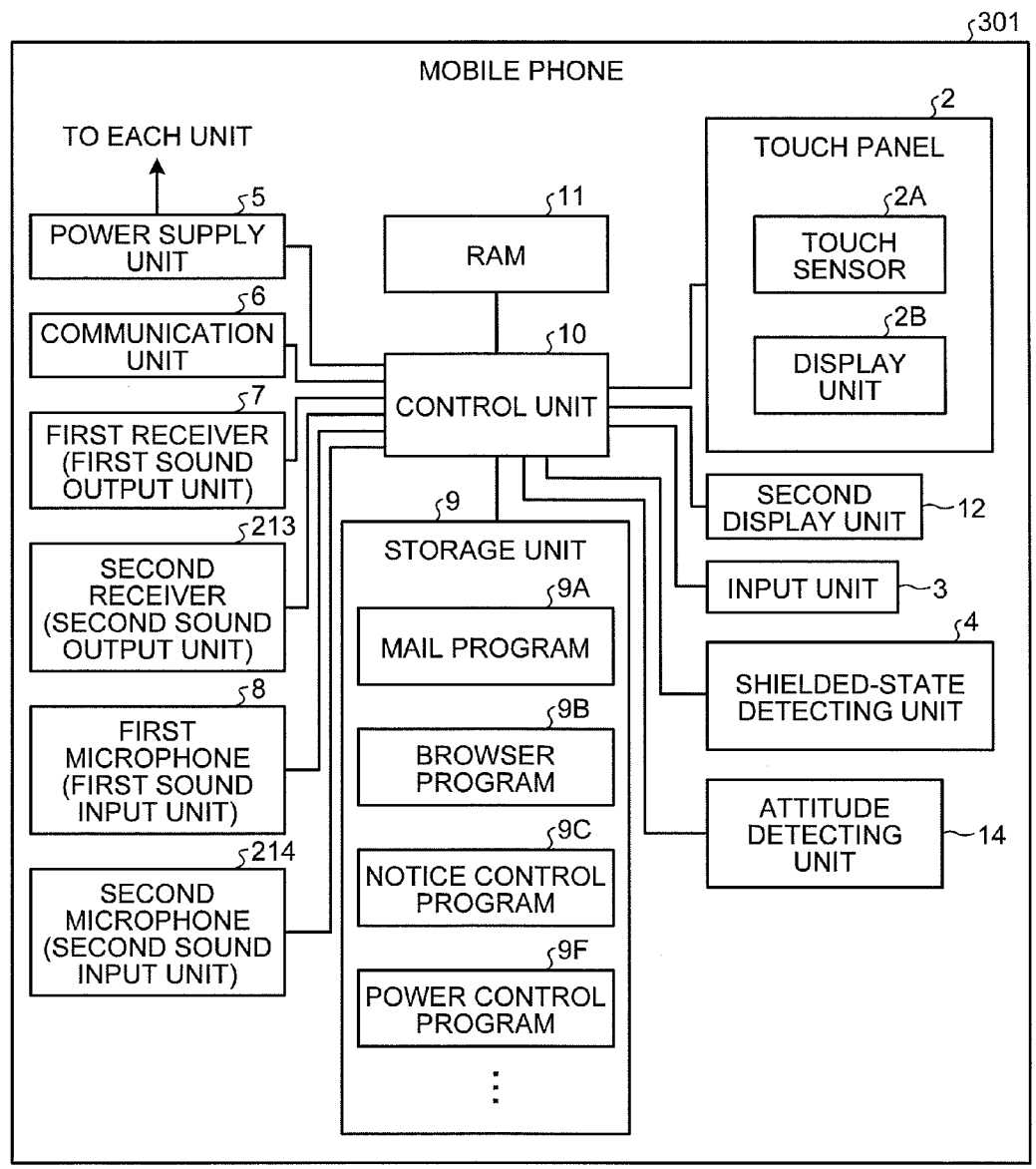
FIG. 18 is a block diagram of a mobile phone according to a fourth embodiment.

A mobile phone 301 will be explained with reference to FIGS. 18 and 19 according to the fourth embodiment. The outer configuration of the mobile phone 301 of the fourth embodiment is the same as the outer configuration of the mobile phone 201. FIG. 18 is a block diagram of the mobile phone 301 according to the fourth embodiment. The components of FIG. 18 that have the same functions as those of FIG. 16 are denoted with the same reference numbers and the explanations of the same components are not repeated. Different matters are mainly explained below.

As illustrated in FIG. 18, the mobile phone 301 includes not only the components of the third embodiment (FIG. 16) but also the attitude detecting unit 14. The configuration of the attitude detecting unit 14 is the same as the configuration of the attitude detecting unit 14 of the mobile phone 1. The attitude detecting unit 14 detects whether the front surface 1A of the housing 20 faces upward in the vertical direction, i.e., it is in the first attitude or the front surface 1A faces downward in the vertical direction, i.e., it is in the second attitude and outputs the detected result to the control unit 10. In other words, it is detected whether the front surface 1A of the housing 20 faces up or down. The attitude detecting unit 14 detects the attitude of the mobile phone 301 and sends the detected result to the control unit 10. When an event occurs during the power saving mode that is not caused by a user operation, the control unit 10 activates the attitude detecting unit 14 and causes the attitude detecting unit 14 to detect the attitude of the mobile phone 301.

FIG. 19 a flowchart of an example of a process performed by the control unit 10 during the low power consumption mode. The same steps of FIG. 19 as those of FIG. 17 are denoted with the same numbers. In FIG. 19, the mobile phone 301 is in the low power consumption mode (the light of the display unit 2B is OFF and the touch sensor 2A is OFF). First, the control unit 10 determines whether an event occurs that is not caused by a user operation (for example, an incoming mail, an incoming voice call, an alarm, etc.) (Step S101). When an event occurs that is not caused by a user operation ("Yes" at Step S101), the control unit 10 activates the shielded-state detecting unit 4 (Step S102) and causes the shielded-state detecting unit 4 to detect whether the display unit 2B is shielded (Step S103). When it is detected that the display unit 2B is not shielded ("No" at Step S104), the control unit 10 sets the low power consumption mode OFF (switches the light of the display unit 2B ON and switches the touch sensor 2A ON), enables sound output of the first receiver 207, and enables sound input of the first microphone 208 (Step S126).

On the other hand, when it is detected that the display unit 2B is shielded ("Yes" at Step S104), the control unit 10 activates the attitude detecting unit 14 and causes the attitude detecting unit 14 to detect the attitude of the mobile phone 301 (Step S122). When the attitude detecting unit 14 completes the detection, the control unit 10 switches the attitude detecting unit 14 OFF. When it is detected that the attitude is the first attitude (the front surface 1A of the housing 20 faces upward in the vertical direction), the control unit 10 maintains the low power consumption mode (keeps the light of the display unit 2B OFF and keeps the touch sensor 2A OFF), and increase the volume of the first receiver 207 to a level larger than a set level (Step S125). On the other hand, when it is in the second attitude (the front surface 1A of the housing 20 faces downward in the vertical direction), the control unit 10 maintains the low power consumption mode (keeps the light of the display unit 2B OFF and keeps the touch sensor 2A OFF), prevents sound input from the first microphone 208, and enables sound input from the second microphone 214 (Step S124).

As described above, the mobile phone 301 includes the attitude detecting unit 14 that can detect whether the attitude is the first attitude, in which the first surface (front surface) 1A of the housing 20 faces upward in the vertical direction, or the second attitude, in which the first surface (front surface) 1A faces downward in the vertical direction. When an event occurs during the low power consumption mode that is not caused by a user operation, the control unit 10 increases the volume of the first receiver 207 to a level larger than a set level if the shielded-state detecting unit 4 detects that the display unit 2B is shielded and the attitude detecting unit 14 detects the first attitude. When the shielded display unit 2B faces up (for example, when a sheet is placed on the display unit 2B, or when the mobile phone 301 is inside a bag or a pocket), because the volume of the first receiver 207 is increased, the user is more likely to notice that the event has occurred.

The mobile phone 301 further includes the first microphone 208 that is arranged on the first surface (front surface) 1A of the housing 20 and the second microphone 214 that is arranged on the second surface (back surface) 1B of the housing 20. When an event occurs during the low power consumption mode that is not caused by a user operation, the control unit 10 prevents sound input from the first microphone 208 and enables sound input from the second microphone 214 if the shielded-state detecting unit 4 detects that the display unit 2B is shielded and the attitude detecting unit 14 detects the second attitude. Therefore, when the second display unit 12 faces up, sound input from the second microphone 214 is enabled.

The first to the fourth embodiments can be implemented solely or in a combined manner. The apparatuses, the methods, and the programs of the present invention according to the first to the fourth embodiments do not restrict the scope of the present invention indicated by the claims. They are merely examples of selected embodiments of the present invention. They merely indicate selected embodiments of the apparatus and the method that are consistent the present invention indicated by the claims. A person skilled in the art can make the present invention without one or more specified items by using another method, another component, another module, or another material. A person skilled in the art can change the order of the steps of the processes illustrated in the flowcharts, delete a step, or add a new step.

Although, in the above embodiments, the present invention is applied to an electronic device that has a touch panel as a display unit, the present invention can be applied to an electronic device that has a simple display panel with no touch sensor imposed thereon. Although, during the low power consumption mode, at least a power saving control over the touch panel 2 is performed, it is allowable to switch the light of various lamps, keys, etc., OFF. The low power consumption mode can have two or more states with different consumption powers.

What is claimed is:

1. An electronic device, comprising:
a first surface;
a second surface;
a display unit arranged on the first surface;
a notification unit arranged on the second surface;
an attitude detecting unit for detecting whether an attitude of the electronic device is a first attitude, in which the first surface faces upward in the vertical direction, or a second attitude, in which the first surface faces downward in the vertical direction; and
a control unit that is configured to, when the attitude detecting unit detects the second attitude, prevent displaying on the display unit and enable the notification unit to give a notification,
wherein, when an event to display information on the display unit occurs while the attitude detecting unit is detecting the second attitude, the control unit causes the notification unit to display a notice corresponding to the information to be displayed on the display unit.

2. The electronic device according to claim 1, wherein, when the attitude detecting unit detects the first attitude, the control unit enables displaying on the display unit and prevents the notification unit from giving the notification.

3. The electronic device according to claim 1, wherein the display unit is a first display unit, and the notification unit is a second display unit whose display area is smaller than that of the first display unit, and the notification unit gives the notification by displaying the notification on the second display unit.

4. The electronic device according to claim 1, wherein when the event to display information on the display unit occurs while the attitude detecting unit is detecting the second attitude and then the attitude detecting unit detects a shift to the first attitude, the control unit displays a content of the event on the display unit.

5. The electronic device according to claim 1, further comprising an operating unit, wherein
when the event to display information on the display unit occurs while the attitude detecting unit is detecting the second attitude and then the attitude detecting unit detects a shift to the first attitude, the control unit displays a notice for requesting unlock on the display unit, and
when the operating unit detects an unlock operation, the control unit displays a content of the event on the display unit.

6. The electronic device according to claim 1, wherein when the event is an incoming mail and the attitude detecting unit detects a shift to the first attitude, the control unit displays a content of the incoming mail on the display unit.

7. The electronic device according to claim 1, wherein when an application is activated while the attitude detecting unit is detecting the first attitude and then the attitude detecting unit detects a shift to the second attitude while the application is running, the control unit terminates the application and switches lighting of the display unit OFF.

8. A control method for controlling an electronic device, the electronic device including:
a first surface;
a second surface;
a display unit arranged on the first surface;
a notification unit arranged on the second surface;
a control unit; and
an attitude detecting unit,
the method comprising:
detecting, by the attitude detecting unit, whether an attitude of the electronic device is a first attitude, in which the first surface faces upward in the vertical direction, or a second attitude, in which the first surface faces downward in the vertical direction; and
preventing displaying on the display unit and enabling the notification unit to give a notification when the second attitude is detected,
wherein, when an event to display information on the display unit occurs while the attitude detecting unit is detecting the second attitude, the control unit causes the notification unit to display a notice corresponding to the information to be displayed on the display unit.

9. A non-transitory storage medium that stores a control program for execution by an electronic device, the electronic device including:
  a first surface;
  a second surface;
  a display unit arranged on the first surface;
  a notification unit arranged on the second surface;
  a control unit; and
  an attitude detecting unit,
the control program, when executed by the electronic device, causing the electronic device to execute:
  detecting, by the attitude detecting unit, whether an attitude of the electronic device is a first attitude, in which the first surface faces upward in the vertical direction, or a second attitude, in which the first surface faces downward in the vertical direction; and
  preventing displaying on the display unit and enabling the notification unit to give a notification when the second attitude is detected,
  wherein, when an event to display information on the display unit occurs while the attitude detecting unit is detecting the second attitude, the control unit causes the notification unit to display a notice corresponding to the information to be displayed on the display unit.

* * * * *